United States Patent
Kitaura et al.

[11] Patent Number: 5,974,095
[45] Date of Patent: Oct. 26, 1999

[54] DIGITAL SATELLITE BROADCASTING RECEIVER

[75] Inventors: Kazuo Kitaura, Osaka; Tomoyuki Nagai, Kyoto; Futoshi Hayama, Nara, all of Japan

[73] Assignee: Sharp Kabushiki Kaisha, Osaka, Japan

[21] Appl. No.: 08/723,947

[22] Filed: Sep. 26, 1996

[30] Foreign Application Priority Data

Sep. 26, 1995 [JP] Japan .................................. 7-247528
Nov. 27, 1995 [JP] Japan .................................. 7-307423
Sep. 10, 1996 [JP] Japan .................................. 8-239255

[51] Int. Cl.$^6$ .............................. H03D 1/00; H04L 27/06
[52] U.S. Cl. ........................ 375/340; 455/106; 455/300; 455/301
[58] Field of Search .............................. 375/340; 455/106, 455/300, 301

[56] References Cited

U.S. PATENT DOCUMENTS

| | | |
|---|---|---|
| 3,816,911 | 6/1974 | Knappenberger .......................... 29/626 |
| 3,869,579 | 3/1975 | Karl .......................................... 179/15 |
| 5,325,401 | 6/1994 | Halik et al. . | |
| 5,355,532 | 10/1994 | Kubo et al. .............................. 455/301 |
| 5,412,340 | 5/1995 | Tanikoshi ................................. 330/68 |
| 5,428,326 | 6/1995 | Mizan et al. ........................... 333/219.1 |
| 5,457,817 | 10/1995 | Nagai et al. ........................... 455/180.3 |
| 5,603,115 | 2/1997 | Ku ........................................... 455/254 |
| 5,625,640 | 4/1997 | Palmer et al. ........................... 375/202 |
| 5,661,441 | 8/1997 | Morino et al. ............................. 331/67 |
| 5,661,761 | 8/1997 | Iwamatsu ................................. 375/344 |
| 5,671,220 | 9/1997 | Tonomura ................................. 370/281 |
| 5,710,999 | 1/1998 | Iwase et al. .............................. 455/349 |
| 5,739,874 | 4/1998 | Badger et al. ........................... 348/731 |
| 5,812,591 | 9/1998 | Shumaker et al. ....................... 375/206 |

Primary Examiner—Stephen Chin
Assistant Examiner—Mohammad Ghayour

[57] ABSTRACT

A tuner part of a digital satellite broadcasting receiver includes an IF signal demodulator part and an I/Q signal demodulator part. These demodulator parts are formed on different substrates, and covered with different chassis respectively. Low-pass filters are provided between an amplifier circuit of the IF signal demodulator part and an output terminal and between an IF signal input terminal of the I/Q signal demodulator part and a baseband converter circuit respectively. Further, an AGC detector circuit for detecting the level of an IF signal for the baseband converter circuit is provided for controlling the amplifier circuit of the IF signal demodulator part by its AGC voltage.

35 Claims, 25 Drawing Sheets

DIGITAL SATELLITE BROADCASTING RECEIVER

BACKGROUND OF THE INVENTION

1. Field of the Invention

The present invention relates to a receiver for receiving satellite broadcasting which transmits digitally compressed video and audio information digitally modulated by QPSK (quadrature phase shift keying) modulation, for example, and more particularly, it relates to a tuner part for receiving signals of the 1 GHz band from an antenna (LNB: low noise block downconverter) and selecting a channel.

2. Description of the Background Art

Satellite television broadcast systems can be divided into an analog FM system which frequency-modulates analog video and audio signals and a digital modulation system which digitizes and compresses analog video and audio signals and digitally modulates the compressed data by QPSK modulation or the like for transmitting the same.

Due to the development of the semiconductor technique and the digital image compression technique, it is nowadays possible to transmit a larger number of television programs by the digital modulation system in the same frequency band as compared with the analog FM system. Therefore, digital modulation satellite broadcasting is employed or planned at present. Also in relation to CATV (cable television) and ground wave broadcasting, employment of the digitization system is discussed.

FIG. 35 is a block diagram showing a part 402 for making a transport output in a digital DBS (direct broadcasting satellite) receiver 400. The term "transport output" indicates a data format defined by the MPEG standard for transmission/reception of data compressed in the MPEG standard. Video and audio data are multiplexed in the transport output.

Referring to FIG. 35, the transport output part 402 includes an RF (radio frequency) signal input terminal 60, a tuner circuit 410 for selecting a signal of a certain single channel from RF signals and converting the same to an intermediate frequency (hereinafter referred to as IF) signal, an I/Q demodulator 412 for demodulating baseband signals including I (in-phase) and Q (Quadrature-phase) signals from the IF signal, and a QPSK demodulator+FEC part 414 for digitally processing outputs of the I/Q demodulator 412, performing error detection, error correction etc. and obtaining the transport output.

The QPSK demodulator+FEC part 414 includes an A/D converter circuit 416 for digitizing the baseband signals outputted from the I/Q demodulator 412, a QPSK demodulator 418 for QPSK-demodulating outputs of the A/D converter circuit 416, a Viterbi decoder 420 for Viterbi-decoding outputs of the QPSK demodulator 418, and a Reed-Solomon error correcting circuit 422 for error-correcting outputs of the Viterbi decoder 420 by Reed-Solomon coding.

The Viterbi decoding is one technique for detecting the most probable series in case of receiving data series recorded with data-to-data correlation. The feature of the Viterbi decoding resides in that the original data series is easy to detect even when the data include noise. The Reed-Solomon coding is one error correction coding methods for transmitting/receiving data with the addition of data for error correction.

The QPSK demodulator 418 and the I/Q demodulator 412 are controlled by a microcomputer 404.

FIG. 36 shows the block structure of the conventional tuner part 408 along with the relation between a chassis for shielding and a substrate. In the following description including that of FIG. 36, it is assumed that the respective circuits are clearly divided into blocks, simply for the purpose of convenience. In practice, the circuits are not so clearly divided into blocks.

Referring to FIG. 36, the tuner part 408 includes an IF signal demodulator part or tuner circuit 410 for selecting a signal of a single channel from RF signals of the 1 GHz band consisting of a plurality of channels received from an LNB of an antenna, amplifying this signal and converting the same to an IF signal, and an I/Q signal demodulator part 412 for demodulating I and Q signals which are baseband signals by demodulating the IF signal outputted from the IF signal demodulator part 410. The IF signal demodulator part 410 and the I/Q signal demodulator part 412 are formed on the same substrate 432, and stored in a single chassis 430.

The IF signal demodulator part 410 includes an RF signal input circuit 90 which is connected to receive the RF signals from the RF signal input terminal 90, a frequency selector circuit 96 for oscillating a first local oscillation signal for selecting a signal of a certain single channel from the RF signals, an IF signal converter circuit 92 for mixing the first local oscillation signal with the RF signal for converting the same to an IF signal, an amplifier circuit 94 for amplifying the IF signal at an amplification factor which is decided by a supplied AGC (Auto Gain Control) voltage and controlling the same to a prescribed bandwidth for outputting this signal, and an AGC control circuit 98 for controlling a signal attenuation factor in the RF signal input circuit 90 and the signal amplification factor in the amplifier circuit 94 on the basis of an AGC control voltage (AGC IN) supplied from a terminal 78. The AGC control voltage is supplied from an integrated circuit for PSK/QPSK demodulation which will be described later.

This tuner part 408 has an input terminal 66 for applying supply voltage to the LNB, source voltage terminals 68 and 70 for supplying source voltages, terminals 72 and 74 for supplying data for specifying a selected frequency from the microcomputer and a clock signal, respectively and a terminal 76 for supplying a tuning voltage (28 V).

The I/Q signal demodulator part 412 includes a second oscillator circuit 112 for outputting a second local oscillation signal having a frequency substantially identical to the frequency of the IF signal, a 90° phase shifter 114 for producing two oscillation signals which are 90° out of phase with each other from the second local oscillator circuit 112, a baseband converter circuit 116 for mixing the IF signal received from the amplifier circuit 94 with the two oscillation signals from the 90° phase shifter 114 with each other, converting the same to baseband signals consisting of I and Q signals and outputting these signals, and an amplifier circuit 118 for amplifying the I and Q signals outputted from the baseband converter circuit 116 respectively and outputting the same to I/Q signal output terminals 62 and 64. The I/Q signal demodulator part 412 further has terminals 84, 86 and 88 for supplying prescribed source voltages.

The terminals 72 and 74 are connected to the microcomputer 404 (not shown in FIG. 36) shown in FIG. 35.

Referring to FIG. 36, the RF signals inputted in the RF signal input terminal 60 are supplied to the IF signal converter circuit 92 through the RF signal input circuit 90. These RF signals are mixed with the first local oscillation signal which is outputted from a first local oscillator included in the frequency selector circuit 96, whereby the IF signal converter circuit 92 outputs IF signals having frequencies defined by the frequency differences between the RF signals and the first local oscillation signal. At this time, the frequency of the first local oscillation signal outputted from the frequency selector circuit 96 is locked on the basis of channel data supplied from the microcomputer 404. Thus, the IF signal converter circuit 92 selects only one channel.

The IF signal is amplified by the amplifier circuit 94 and bandwidth-limited to become a signal having a frequency of 479.5 MHz, further level-controlled in accordance with a control voltage from the AGC control circuit 98, and guided to the I/Q signal demodulator part 412.

The second local oscillator 112 generates a second local oscillation signal having the same frequency as the IF signal. The 90° phase shifter 114 produces signals which are 90° out of phase with each other from the second local oscillation signal, and supplies the same to the baseband converter circuit 116. The baseband converter circuit 116 mixes the IF signal with the two oscillation signals which are 90° out of phase with each other respectively, and extracts phase information from the IF signal, thereby obtaining I and Q signals which are baseband signals.

The I and Q signals are amplified by the amplifier circuit 118 to proper levels respectively, supplied to a subsequent circuit (QPSK demodulator part) from the I/Q signal output terminals 62 and 64, to be QPSK-demodulated.

As hereinabove described, the second local oscillation signal generated from the second local oscillator 112 in the I/Q signal demodulator part 412 is made to have the same frequency as the IF signal, in order to demodulate the IF signal. Further, the IF signal demodulator part 410 and the I/Q signal demodulator part 412 are formed on the same single substrate 432, and stored in the single chassis 430. Thus, the IF signal demodulator part 410 and the I/Q signal demodulator part 412 share a ground pattern.

Therefore, the second local oscillation signal from the second local oscillator 112 of the I/Q signal demodulator part 412 may be mixed into the IF signal demodulator part 410 through a power supply line, a signal line and the ground pattern on the common substrate 432. Since the 90° phase shifter 114 and the AGC control circuit 98 are arranged on the same substrate 432 in proximity to each other, further, a harmonic twice or three times the second local oscillation signal from the second local oscillator 112 may be mixed into the AGC control circuit 98 from the 90° phase shifter 114 through a floating capacitance, and inputted in the RF signal input terminal 60 through the circuits in the IF signal demodulator part 410.

If the RF signal selected in the IF signal converter circuit 92 has the same frequency as this harmonic in this case, the unnecessary harmonic interferes with the originally required normal IF signal, leading to inferior QPSK modulation. In case of digital broadcasting, such inferior demodulation results in data loss to mosaic the screen, and the picture quality is heavily deteriorated as compared with the analog system. Therefore, such interference is preferably eliminated to the minimum.

For example, the second local oscillator 112 oscillates at 479.5 MHz. Harmonics twice, three times and four times this frequency are 959 MHz, 1438.5 MHz and 1918 MHz respectively. Spurious responses are caused at input frequencies in the range of ±10 MHz with respect to these frequencies. In case of the harmonic having the frequency of 959 MHz, for example, a spurious response is caused in the range of input frequencies of 949 MHz to 969 MHz.

While the AGC control circuit 98 of the IF signal demodulator part 410 is supplied with the AGC control voltage from the QPSK demodulator part, it is necessary to quicken the response of AGC control through the AGC control circuit 98 and the amplifier circuit 94, in order to perform QPSK demodulation in an excellent state.

SUMMARY OF THE INVENTION

Accordingly, an object of the present invention is to provide a digital satellite broadcasting receiver having a tuner part which can effectively prevent signal interference caused by mixture of a second local oscillation signal and its harmonic into an IF signal demodulator part, for maintaining an excellent receiving state.

Another object of the present invention is to provide a digital satellite broadcasting receiver having a tuner part which can properly keep an amplification factor for an IF signal so that QPSK demodulation is performed in an excellent state.

The inventive digital satellite broadcasting receiver includes a tuner including an IF signal demodulator part for selecting a signal of a single channel from RF signals received by an antenna and converting the same to an IF signal, an I/Q signal demodulator part for demodulating I and Q signals from the IF signal outputted from the IF signal demodulator part, a first shielding storer for storing the IF signal demodulator part, and a second shielding storer, which is different from the first shielding storer, for storing the I/Q signal demodulator part.

The IF signal demodulator part and the I/Q signal demodulator part are stored in different shielding storers, whereby it is possible to prevent an unnecessary oscillation signal from being mixed into the IF signal demodulator part from the I/Q signal demodulator part. The I/Q signal demodulator part is prevented from occurrence of signal interference, whereby an excellent receiving state can be maintained.

Preferably, the IF signal demodulator part includes a first substrate, and a circuit element for IF signal demodulation which is arranged on the first substrate. The I/Q signal demodulator part includes a second substrate which is different from the first substrate, and a circuit element for I/Q signal demodulation which is arranged on the second substrate.

More preferably, the IF signal demodulator part includes an RF signal input circuit for inputting the RF signals, a first local oscillator circuit for oscillating a first local oscillation signal for selecting the signal of the single channel from the RF signals, and amplifier circuit for mixing the local oscillation signal with the RF signal, converting the same to an IF signal, and amplifying the IF signal at an amplification factor which is decided by an externally supplied control signal. The I/Q signal demodulator part includes a second oscillation signal generating circuit for generating a second local oscillation signal having a frequency substantially identical to that of the IF signal for orthogonally detecting the IF signal, a mixer for orthogonally detecting the IF signal with the local oscillation signal for demodulating baseband signals, a detector circuit which is connected to receive the IF signal inputted in the mixer for detecting the IF signal inputted in the mixer and outputting a control signal to be supplied to the amplifier circuit of the IF signal demodulator part, and an amplifier circuit for amplifying outputs of the mixer and controlling the same to a prescribed bandwidth for outputting the same.

The level of the IF signal inputted in the I/Q signal demodulator part is detected by the detector circuit, for adjusting the level of the IF signal in the IF signal demodulator part with the detected output. The inputted IF signal is maintained at a constant level, whereby the I/Q demodulator circuit can demodulate I and Q signals of proper levels by simply fine-controlling the amplification factor in the mixer. Thus, processing in a subsequent QPSK demodulator circuit or the like can be performed in an excellent state, and excellent picture quality can be maintained.

The second oscillation signal generating circuit may be a synchronous circuit provided with feedback from the subsequent PSK/QPSK demodulator, or a quasi-synchronous circuit oscillating a local oscillation signal of a prescribed frequency with no feedback. The circuit can be properly selected in accordance with the demodulation system of the subsequent PSK/QPSK demodulator.

The second oscillation signal generating circuit may include a dielectric resonator as an inductance. The dielectric resonator is mounted on the substrate in close contact therewith, whereby the second oscillation signal generating circuit is hardly influenced by vibration and the receiver is resistant against microphonic noise.

According to another preferred embodiment, the IF signal demodulator part and the I/Q signal demodulator part include circuit elements for IF signal demodulation and I/Q signal demodulation which are arranged on separate first and second regions on a surface of a common single substrate respectively, and the first and second shielding storers store the first and second regions of the common single substrate respectively. More preferably, the first and second shielding storers are coupled with each other to form a single part, so that the common single substrate and the circuit elements for IF signal demodulation and I/Q signal demodulation which are arranged on the common single substrate are stored in the coupled first and second shielding storers.

The IF signal demodulator part and the I/Q signal demodulator part are arranged on the common substrate, whereby these circuits are easy to handle in case of assembling the tuner. Further, the IF signal demodulator part and the I/Q signal demodulator part are stored in different shielding storers, whereby mixture of an unnecessary oscillation signal from the I/Q signal demodulator part into the IF signal demodulator part can be prevented. Occurrence of signal interference in the I/Q signal demodulator part is prevented, and an excellent receiving state can be maintained.

According to still another preferred embodiment of the present invention, the IF signal demodulator part includes a substrate, a circuit element for IF signal demodulation which is arranged on the substrate, an IF signal output terminal for deriving an IF signal outputted from the circuit element for IF signal demodulation to the exterior of the substrate, a wiring pattern which is formed on a surface of the substrate between the circuit element for IF signal demodulation and the IF signal output terminal, and a first low-pass filter which is formed by employing the wiring pattern. More preferably, the I/Q signal demodulator part includes another substrate which is different from that of the IF signal demodulator part, a circuit element for I/Q signal demodulation which is arranged on this substrate, an IF signal input terminal for receiving the IF signal outputted from the IF signal demodulator part and derived to the exterior of the substrate from the IF signal output terminal, a wiring pattern which is formed on a surface of the substrate between the IF signal input terminal and the circuit element for I/Q signal demodulation, and a second low-pass filter which is formed by employing the wiring pattern.

The IF signal demodulator part and the I/Q signal demodulator part are arranged on different substrates while these demodulator parts are stored in different shielding storers, whereby it is possible to prevent an unnecessary oscillation signal from being mixed into the IF signal demodulator part from the I/Q signal demodulator part. Occurrence of signal interference in the I/Q signal demodulator part is prevented, and an excellent receiving state can be maintained.

According to another aspect of the present invention, a digital satellite broadcasting receiver has a tuner part, which includes an IF signal demodulator part for selecting a signal of a single channel from received RF signals, converting the same to an IF signal, amplifying the IF signal to a proper level and outputting the same, and an I/Q signal demodulator part for demodulating the IF signal outputted from the IF signal demodulator part and outputting baseband signals including I and Q signals. The IF signal demodulator part includes an RF signal input circuit for inputting the RF signals, a first local oscillator circuit for oscillating a first local oscillation signal for selecting the signal of the single channel from the RF signals, and amplifier circuit for mixing the first local oscillation signal with the RF signal, converting the same to an IF signal and amplifying the same at an amplification factor which is decided by an externally supplied control signal. The I/Q signal demodulator part includes a second oscillation signal generating circuit for generating a second local oscillation signal having a frequency substantially identical to that of the IF signal for orthogonally detecting the IF signal, a mixer for orthogonally detecting the IF signal with the second local oscillation signal and demodulating baseband signals, a matching filter circuit which is inserted in a front stage of the mixer for matching an IF output impedance of the IF signal demodulator part and an input impedance of the mixer, and an amplifier circuit for amplifying outputs of the mixer, controlling the same to a prescribed bandwidth and outputting the same.

The IF output impedance of the IF signal demodulator part is matched with the input impedance of the mixer, whereby a flat characteristic is attained in relation to the IF signal in a necessary frequency band. Level change of the IF signal is reduced, whereby I and Q signals of proper levels can be demodulated in the I/Q demodulator circuit. Thus, processing in a subsequent QPSK demodulator circuit etc. can be superbly performed, occurrence of bit errors is reduced, and excellent picture quality can be maintained.

According to still another aspect of the present invention, a digital satellite broadcasting receiver comprises a tuner part which includes an IF signal demodulator part for selecting a signal of a single channel from received RF signals, converting the same to an IF signal, amplifying the IF signal to a proper level and outputting the same, and an I/Q signal demodulator part for demodulating the IF signal outputted from the IF signal demodulator part and outputting baseband signals including I and Q signals. The IF signal demodulator part includes an RF signal input circuit for inputting the RF signals, a first local oscillator circuit for oscillating a first local oscillation signal for selecting the signal of the single channel from the RF signals, and amplifier circuit for mixing the first local oscillation signal with the RF signal, converting the same to an IF signal, and amplifying the same at an amplification factor decided by an externally supplied control signal. The I/Q signal demodulator part includes a second oscillation signal generating circuit for generating a second local oscillation signal having a frequency substantially identical to that of the IF signal for orthogonally detecting the IF signal, a mixer for orthogonally detecting the IF signal with the second local oscillation signal and demodulating baseband signals, a detector circuit which is connected to receive the IF signal inputted in the mixer for detecting the IF signal and outputting a control signal to be supplied to the amplifier circuit of the IF signal demodulator part, and an amplifier circuit for amplifying outputs of the mixer, controlling the same to a prescribed bandwidth and outputting the same.

The level of the IF signal inputted in the I/Q signal demodulator part is detected by the detector circuit, and the level of the IF signal in the IF signal demodulator part is adjusted with the detected output. The inputted IF signal is maintained at a constant level, whereby the I/Q demodulator circuit can demodulate I and Q signals of proper levels by simply fine-controlling the amplification factor in the mixer. Therefore, processing in a subsequent QPSK demodulator circuit or the like can be performed in an excellent state, and excellent picture quality can be maintained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments 1 to 5 of the inventive digital satellite broadcasting receiver are now described in detail with reference to the drawings.

Embodiment 1

Figure 1:
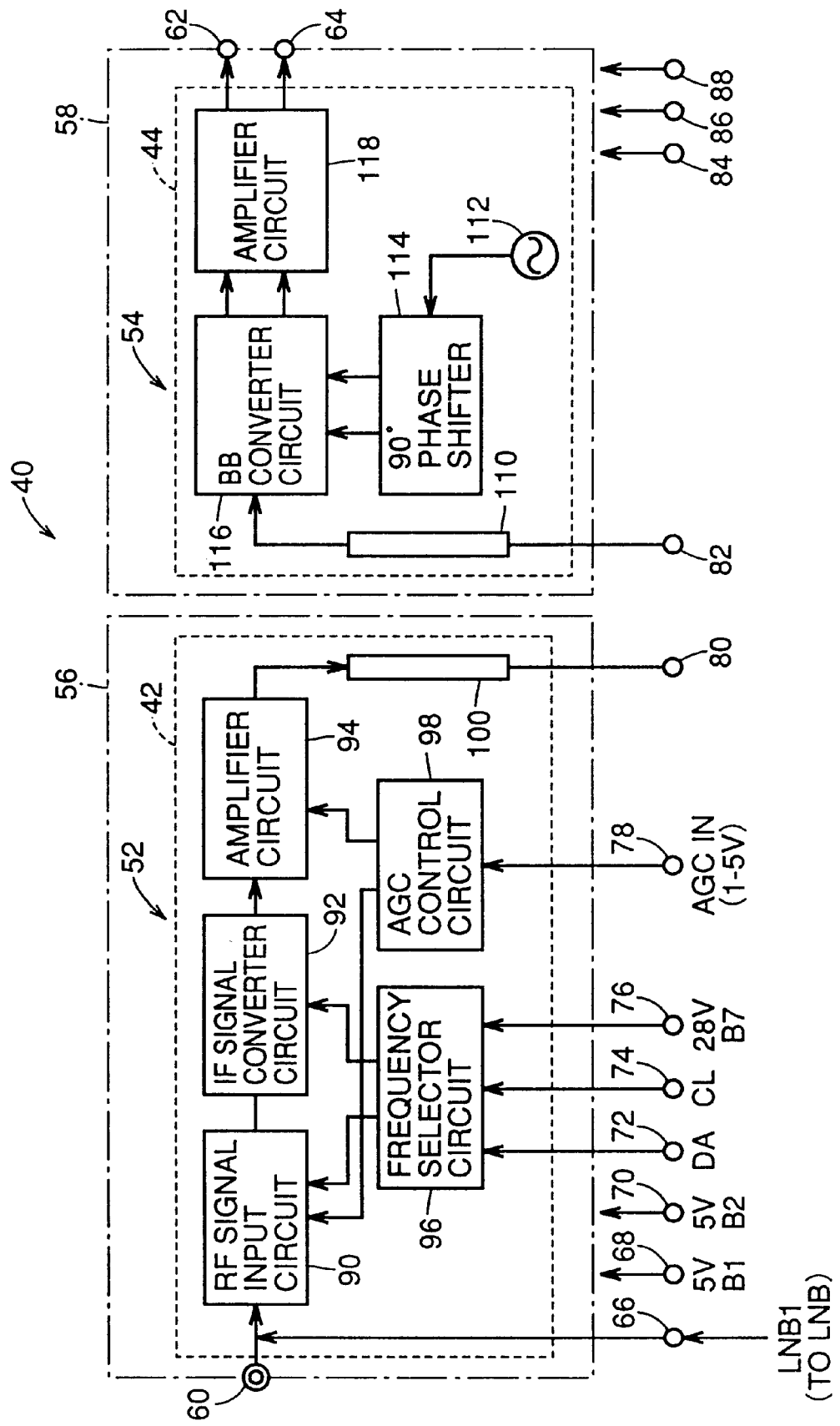
FIG. 1 is a block diagram showing a tuner part according to an embodiment 1.
Figure 35:
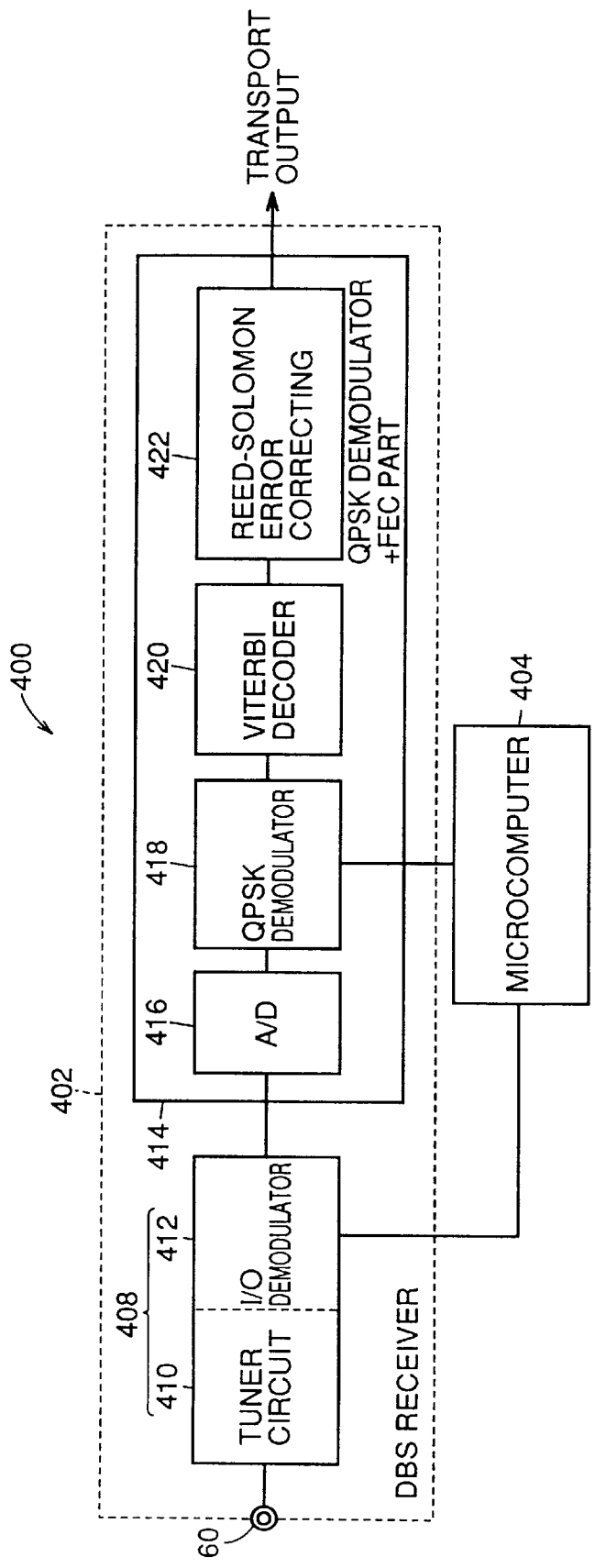
FIG. 35 is a block diagram showing a general DBS receiver.
Figure 36:
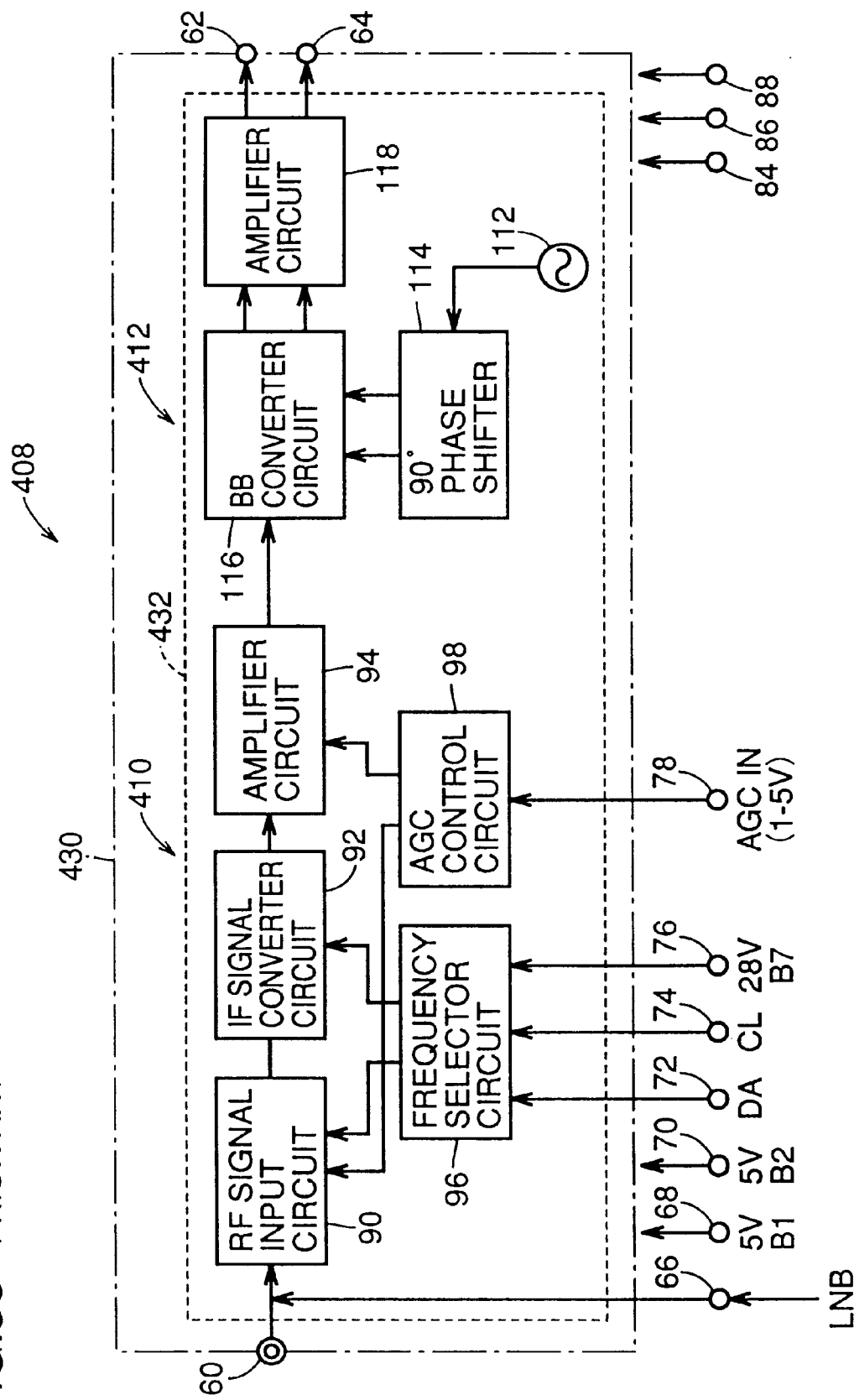
FIG. 36 is a block diagram showing an IF signal demodulator part and an I/Q signal demodulator part of a conventional digital satellite broadcasting receiver.

FIG. 1 is a block diagram showing the structure of a tuner part 40 of the digital satellite broadcasting receiver according to the embodiment 1. While FIGS. 1 to 10 illustrate the tuner part 40 of the digital satellite broadcasting receiver according to the embodiment 1, portions identical to those in the conventional receiver shown in FIGS. 35 and 36 are denoted by the same reference numerals. The names and functions of these portions are also identical to each other. Therefore, detailed description of these portions is not repeated here unless particularly required.

Referring to FIG. 1, the tuner part 4 of the embodiment 1 includes an IF signal demodulator part 52 for selecting a signal of a certain channel from RF signals of the 1 GHz band including a plurality of channels received from an LNB of an antenna, amplifying the signal and thereafter converting the same to an IF signal, and an I/Q signal demodulator part 54 for mixing the IF signal outputted from the IF signal demodulator part 52 with two local oscillation signals which are 90° out of phase with each other thereby demodulating I and Q signals which are baseband signals.

FIGS. 2 to 7 illustrate the structures of the respective circuits shown in FIG. 1 in detail.

Figure 2:
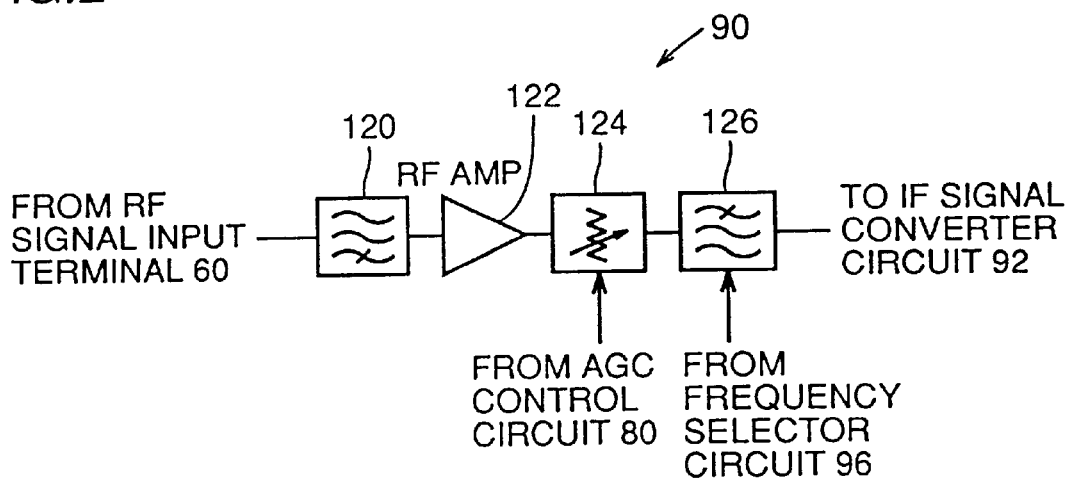
FIG. 2 is a block diagram of an RF signal input circuit.

Referring to FIG. 2, an RF signal input circuit 90 includes a high-pass filter 120 for receiving the RF signals from an RF signal input terminal 60, an RF amplifier 120, an attenuator 124 for attenuating inputs in accordance with a control signal supplied from an AGC control circuit 80, and a low-pass filter 126 for passing only a signal under a prescribed band on the basis of a signal supplied from a frequency selector circuit 96. The output of the low-pass filter 126 is supplied to an IF signal converter circuit 92.

Figure 3:
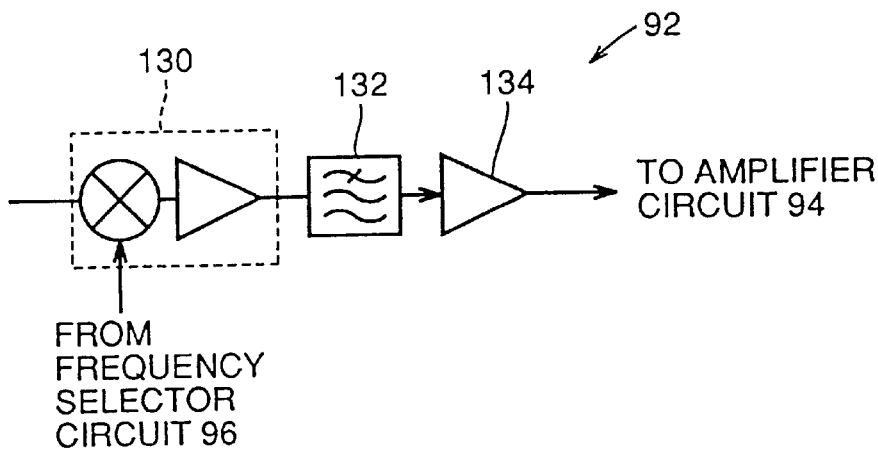
FIG. 3 is a block diagram of an IF signal converter circuit.

Referring to FIG. 3, the IF signal converter circuit 92 includes a mixer 130 for mixing the output of the low-pass filter 126 with a first local oscillation signal supplied from the frequency selector circuit 96 and outputting an IF signal having a frequency which is equal to the frequency difference between the two signals, a low-pass filter 132 for receiving the output of the mixer 130, and an IF amplifier 134 for amplifying an output of the low-pass filter 132 and supplying the same to an amplifier circuit 94.

Figure 4:
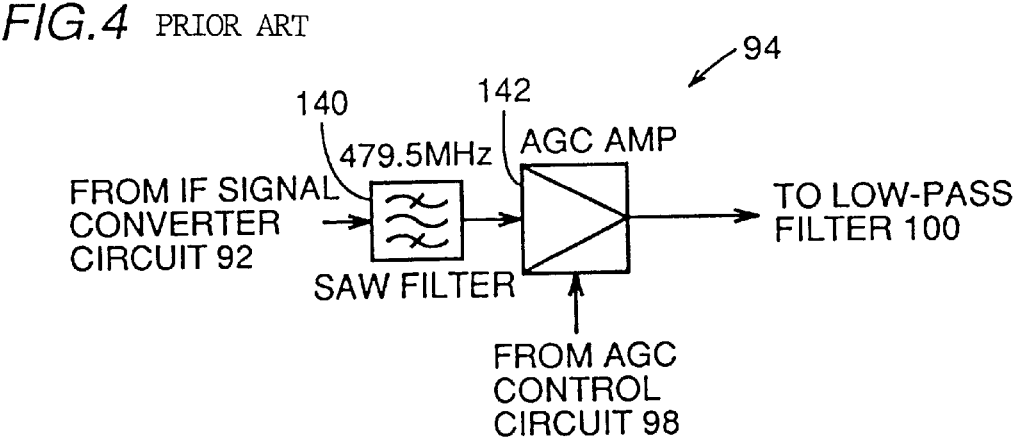
FIG. 4 is a block diagram of an amplifier circuit.

Referring to FIG. 4, the amplifier circuit 94 includes a SAW (surface acoustic wave) filter 140 for bandwidth-limiting an output from the IF signal converter circuit 92, and an AGC amplifier 142 for amplifying an output of the SAW filter 140 in accordance with an AGC control voltage from an AGC control circuit 98 and supplying the same to a low-pass filter 100.

Figure 5:
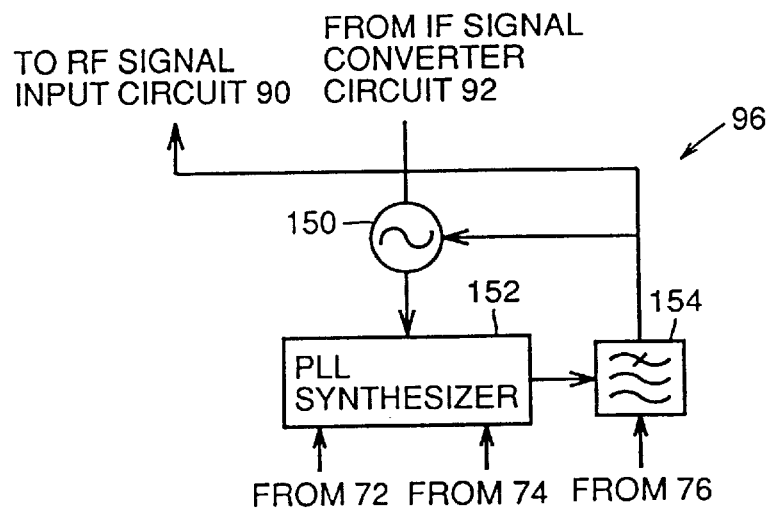
FIG. 5 is a block diagram of a frequency selector circuit.

Referring to FIG. 5, the frequency selector circuit 96 includes a first local oscillator 150 for oscillating the first local oscillation signal and supplying the same to the IF signal converter circuit 92, a PLL (Phase Locked Loop) circuit 152 for controlling the oscillation frequency of the first local oscillator 150 on the basis of channel data supplied from a microcomputer (not shown) through a terminal 72, and a PLL loop filter 154. The PLL loop filter 154 is supplied with a tuning voltage from a terminal 76. An output of the PLL loop filter 154 is supplied to the first local oscillator 150, as well as the low-pass filter 126 of the RF signal input circuit 90.

Figure 6:
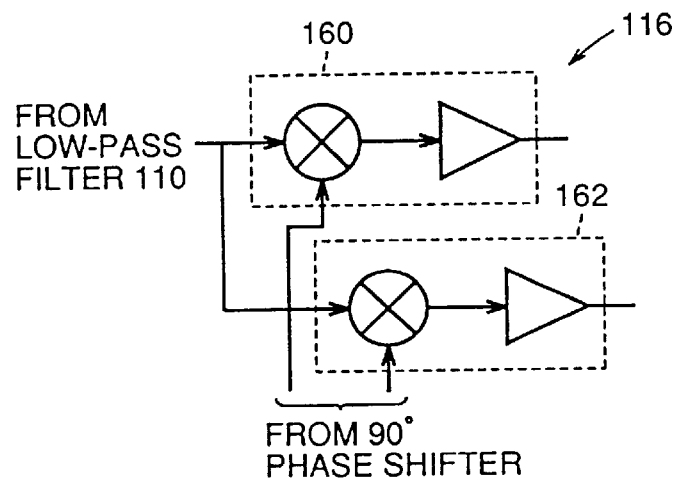
FIG. 6 is a block diagram of a baseband converter circuit.

Referring to FIG. 6, a baseband converter circuit 116 includes two IQ mixers 160 and 162 for mixing the IF signal supplied from a low-pass filter 110 with two second local oscillation signals, which are 90° out of phase with each other, supplied from a 90° phase shifter 114 and outputting I and Q signals respectively.

Figure 7:
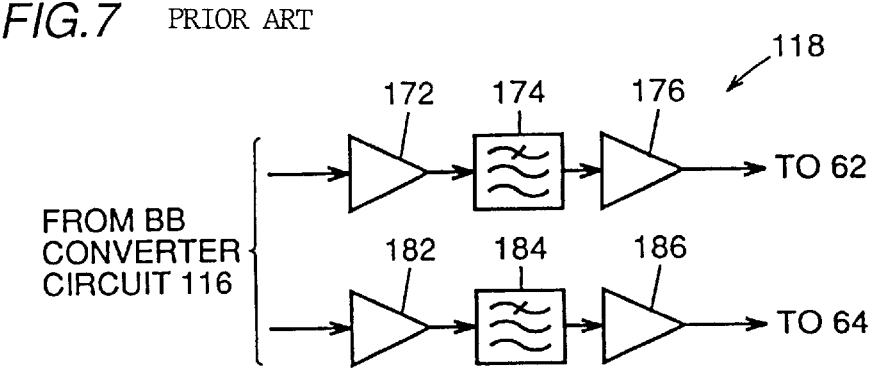
FIG. 7 is a block diagram of the amplifier circuit.

Referring to FIG. 7, an amplifier circuit 118 includes an amplifier 172, a low-pass filter 174 and another amplifier 176 for receiving the I signal from the baseband converter circuit 116, and an amplifier 182, a low-pass filter 184 and another amplifier 186 for receiving the Q signal from the baseband converter circuit 116.

The tuner part 40 shown in FIG. 1 is different from the conventional tuner part 408 shown in FIG. 36 in that the IF signal demodulator part 52 and the I/Q signal demodulator part 54 are formed on different substrates 42 and 44 and stored in different chassis 56 and 58 respectively, that the IF signal demodulator part 52 has a terminal 80 for outputting the IF signal, and that the I/Q signal demodulator part 54 has a terminal 82 for receiving the IF signal. Further, the low-pass filters 100 and 110 for matching an IF output impedance of the amplifier circuit 94 and an input impedance of the baseband converter circuit 116 with each other are newly provided on the substrate 42 between the amplifier circuit 94 and the terminal 80 and on the substrate 44 between the terminal 82 and the baseband converter circuit 116 respectively. Alternatively, only one of the low-pass filters 100 and 110 may be provided.

Figure 8:
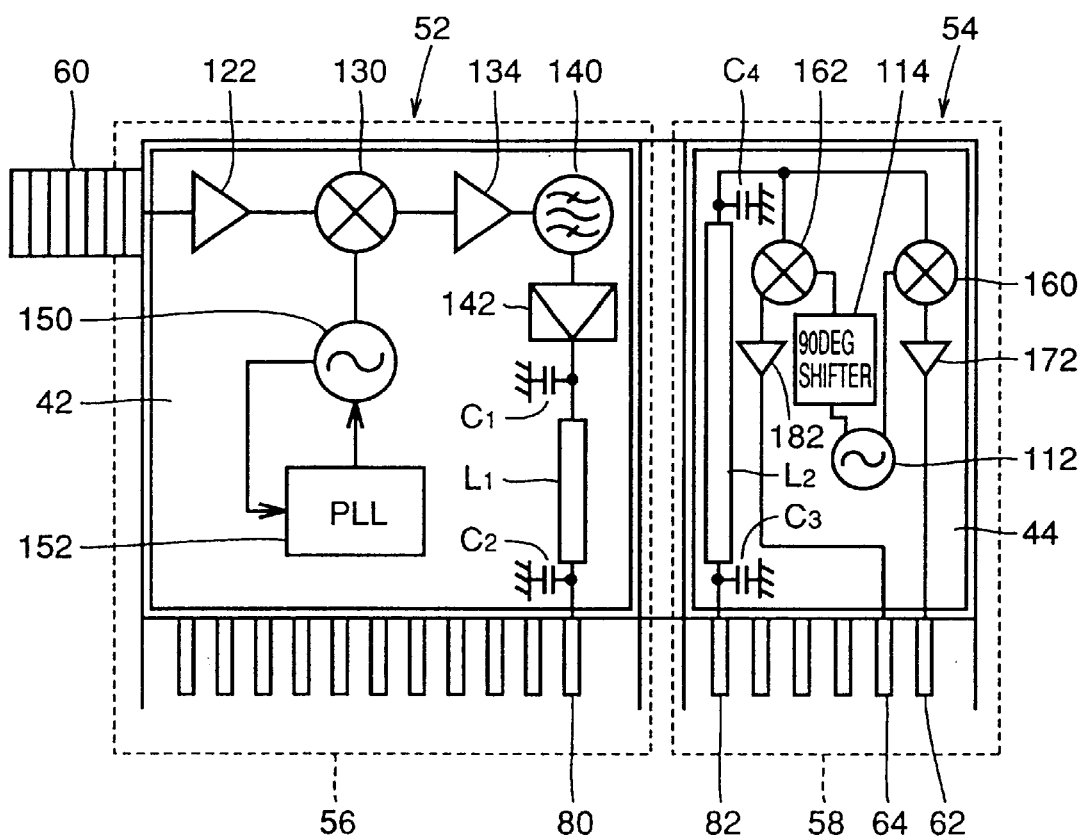
FIG. 8 is a block diagram showing a circuit arrangement state in case of storing an IF signal demodulator part and an I/Q signal demodulator part forming the tuner part according to the embodiment 1 in different chassis respectively.
Figure 9:
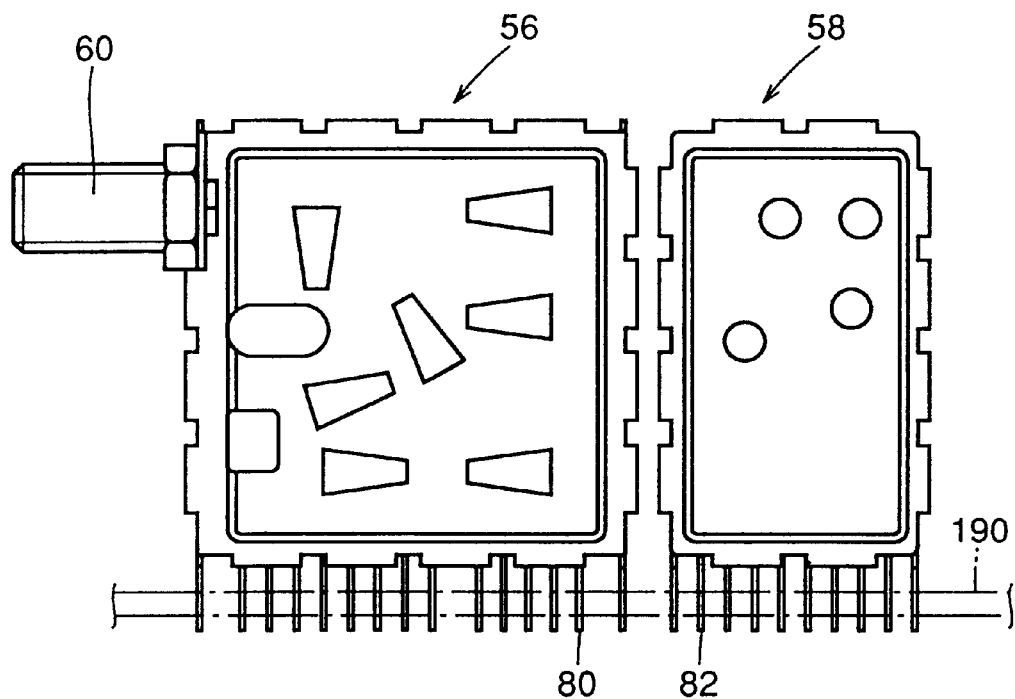
FIG. 9 is a front elevational view of the tuner part according to the embodiment 1 showing the IF signal demodulator part and the I/Q signal demodulator part forming the tuner part, which are stored in different chassis respectively.
Figure 10:
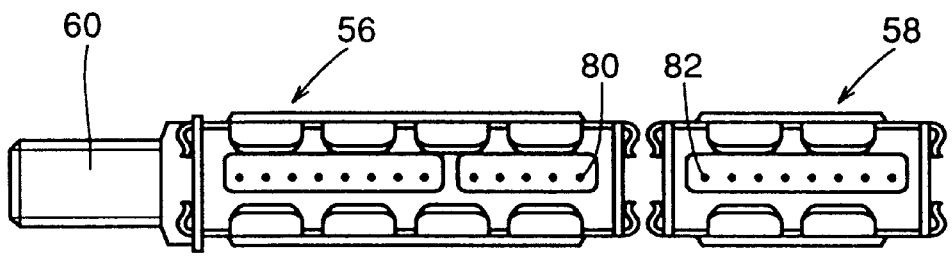
FIG. 10 is a bottom plan view of the tuner part according to the embodiment 1 showing the IF signal demodulator part and the I/Q signal demodulator part forming the tuner part, which are stored in different chassis respectively.

FIGS. 8 to 10 illustrate the state of the IF signal demodulator part 52 and the I/Q signal demodulator part 54 assembled on a common main board 190. The low-pass filter 100 is formed by capacitors $C_1$ and $C_2$ shown in FIG. 8 and a wiring pattern (stripline) $L_1$ which is formed therebetween. On the other hand, the low-pass filter 110 is formed by a wiring pattern (stripline) $L_2$ which is formed between the terminal 82 of the substrate 44 and the mixers 160 and 162 and two capacitors $C_3$ and $C_4$ which are connected to front and rear portions thereof.

As shown in FIGS. 8 to 10, the IF signal demodulator part 52 and the I/Q signal demodulator part 54 are formed on the different substrates 42 and 44 which are independent of each other respectively. Further, the IF signal demodulator part 52 and the I/Q signal demodulator part 54 are stored in the different chassis 56 and 58 respectively. These chassis 56 and 58 are individually mounted on the main board 190, so that the IF signal output terminal 80 of the IF signal demodulator part 52 and the IF signal input terminal 82 of the I/Q signal demodulator part 54 are electrically connected with each other through a pattern on the main board 190.

The IF signal demodulator part 52 operates at a relatively high frequency. Therefore, the substrate 42 is made of glass epoxy resin which is excellent in harmonic characteristic having a small influence of a capacitive component with respect to a harmonic component. On the other hand, the I/Q demodulator part 54 operates at a relatively low frequency (480 MHz). Therefore, the substrate 44 is made of low-priced paper phenol, since the influence by a capacitive component may not be much taken into consideration in case of deciding the material therefor. Thus, the cost for the tuner part 40 can be preferably reduced without deteriorating its performance. However, the materials for the substrates 42 and 44 are not restricted to the aforementioned ones.

In the tuner part 40 according to the embodiment 1, the IF signal demodulator part 52 and the I/Q signal demodulator part 54 are stored in the different chassis 56 and 58 respectively, and respective ground patterns are also independent of each other. Therefore, the second local oscillation signals oscillated by a second local oscillator 112 provided in the I/Q signal demodulator part 54 and harmonics thereof are not mixed into the IF signal demodulator part 52 through the ground patterns or into the AGC control circuit 98 from the 90° phase shifter 114 through floating capacitances. Therefore, no harmonics of the frequencies of the second local oscillation signals are inputted in the RF signal input terminal 60. The harmonics of the second local oscillation signals are prevented from being mixed into the IF signal demodulator part 52 and causing signal interference, whereby an excellent receiving state can be regularly maintained.

Further, the capacitors $C_1$ to $C_4$ are mounted on the front and rear portions of the wiring patterns $L_1$ and $L_2$ of the IF signal demodulator part 52 and the I/Q signal demodulator part 54 respectively, thereby forming the low-pass filters 100 and 110. When the low-pass filters 100 and 110 are set at sufficiently high cut-off frequencies with respect to a necessary frequency band, the frequency characteristic of the tuner part 40 is improved to be flat in the necessary frequency band.

Figure 11:
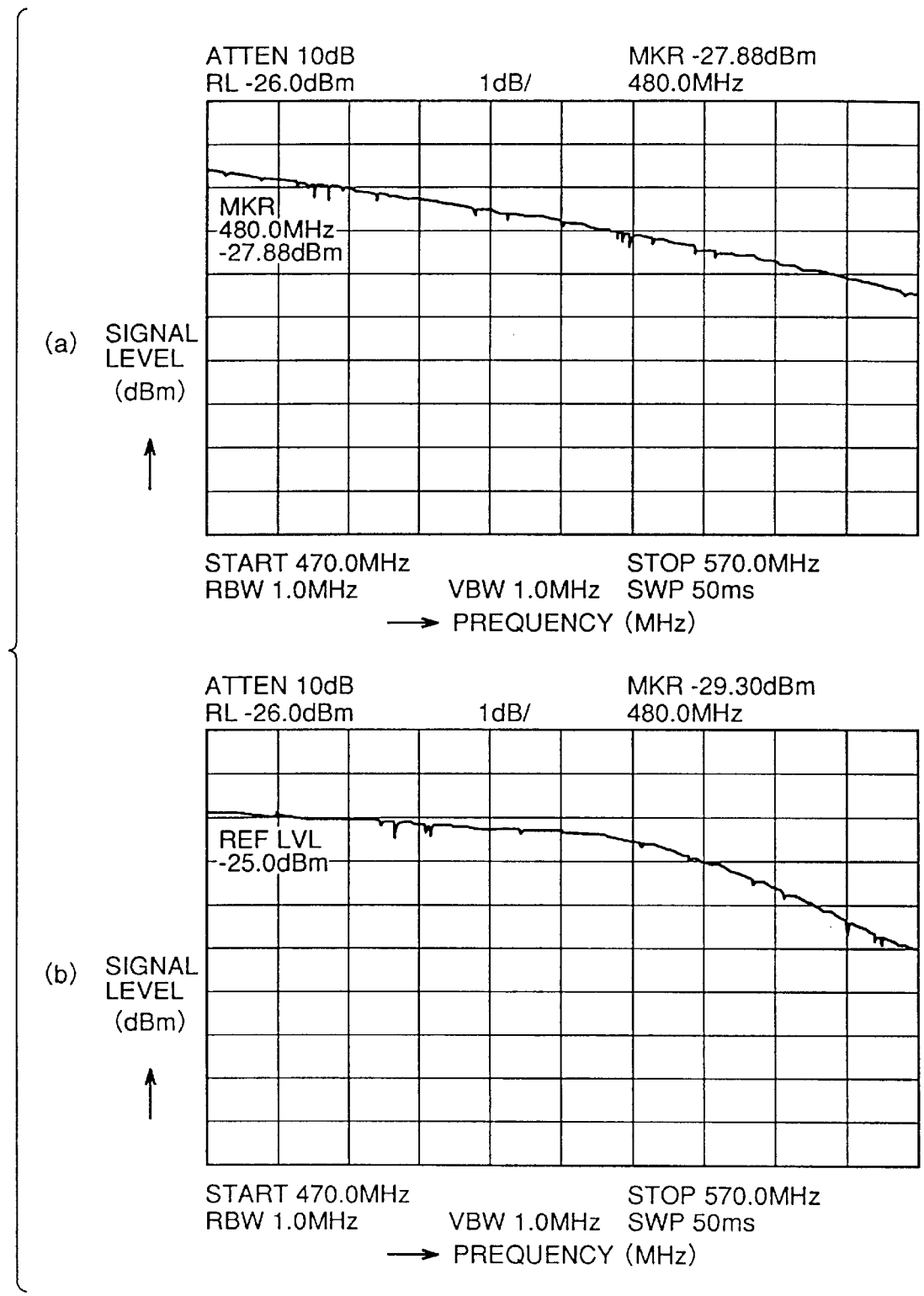
FIG. 11 illustrates frequency characteristics of signal levels in case of not forming and forming low-pass filters in the IF signal demodulator part and the I/Q signal demodulator part at (a) and (b) respectively.

FIG. 11 illustrates changes of signal levels (dBm) with respect to frequencies in case of not providing and providing the low-pass filters 100 and 110 at (a) and (b) respectively. As shown at (a) in FIG. 11, the signal level (dBm) is gradually curvedly inclined with respect to the frequency change when no low-pass filters 100 and 110 are provided. When the low-pass filters 100 and 110 are provided on the substrates 42 and 44 respectively as shown in the embodiment 1 (FIG. 1), a frequency characteristic having a flat portion with relatively small signal level change with respect to the frequency change is attained as shown at (b) in FIG. 11. Therefore, the signal level change is reduced in the necessary frequency band, whereby occurrence of bit errors is effectively reduced in relation to the I and Q signals demodulated by the I/Q signal demodulator part 54.

Figure 12:
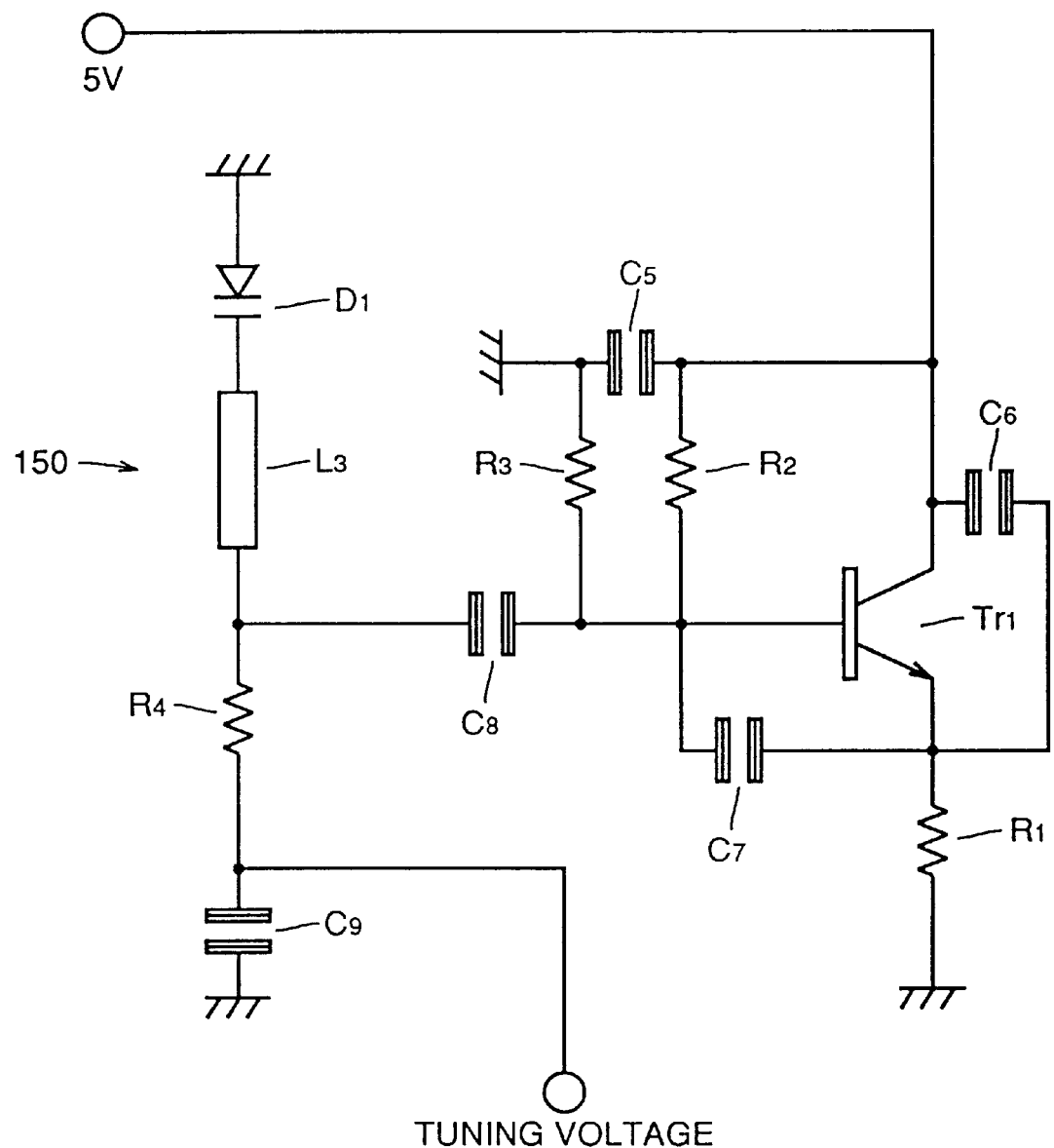
FIG. 12 is a circuit diagram of a first local oscillator.

FIG. 12 illustrates an exemplary circuit structure of the first local oscillator 150. Referring to FIG. 12, the first local oscillator 150 is a Colpitts oscillator, which includes an oscillating transistor $Tr_1$, a ground capacitor $C_5$, feedback capacitors $C_6$ and $C_7$, a coupling capacitor $C_8$, an inductance element $L_3$, resistances $R_1$ to $R_3$ for applying a prescribed bias voltage from a power source (5 V) to the transistor $Tr_1$, a variable capacitance diode $D_1$, and a resistance $R_4$ for applying a tuning voltage to the variable capacitance diode $D_1$.

Figure 13:
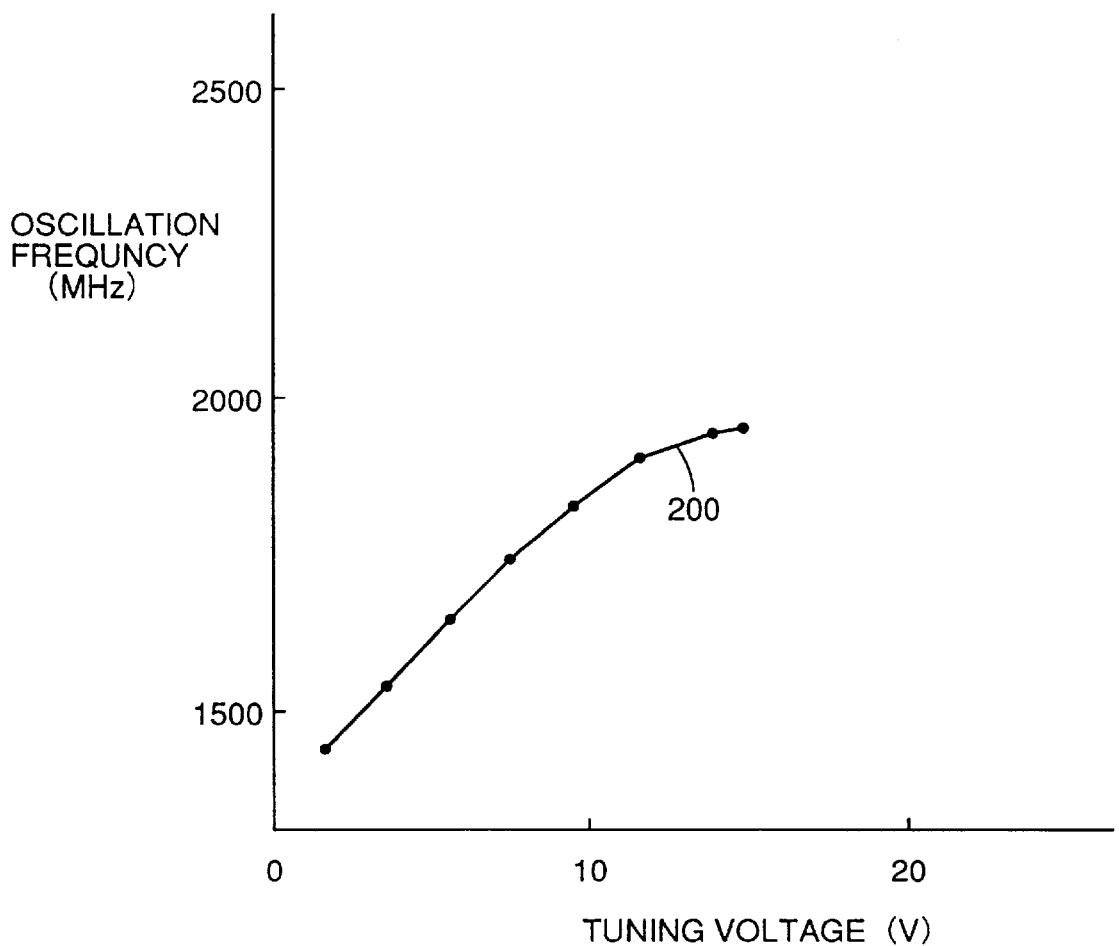
FIG. 13 is a graph showing the relation between tuning voltages and oscillation frequencies in the first local oscillator.

FIG. 13 illustrates a curve 200 showing the relation between tuning voltages and oscillation frequencies of the first local oscillation signal in case of employing the first local oscillator 150 shown in FIG. 12.

Figure 14:
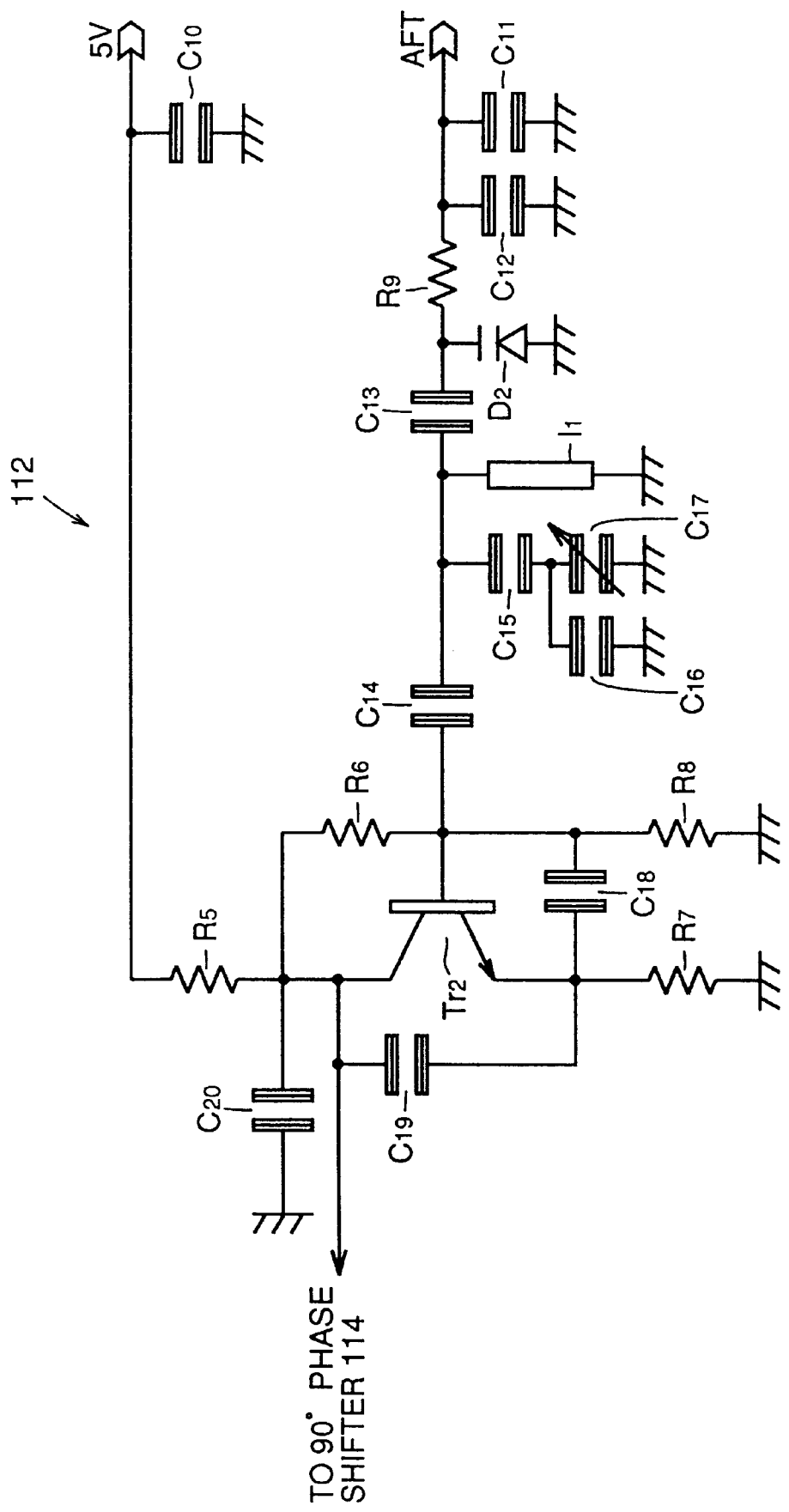
FIG. 14 is a circuit diagram of a second local oscillator.

FIG. 14 shows the circuit structure of the second local oscillator 112. The second local oscillator 112 is basically a Colpitts oscillator circuit, which includes an oscillating transistor $Tr_2$, a ground capacitor $C_{20}$, feedback capacitors $C_{18}$ and $C_{19}$, a coupling capacitor $C_{14}$, an inductance element $I_1$, capacitors $C_{15}$ to $C_{17}$ for fine-controlling the oscillation frequency, and resistances $R_5$ to $R_8$ for applying a prescribed bias voltage from a power source (5 V) to the transistor $Tr_2$. The inductance element $I_1$ is prepared from a surface mount type element such as a dielectric coaxial resonator or a microstripline which is reliably fixed to a substrate.

Referring to FIG. 14, the second local oscillator 112 further includes capacitors $C_{10}$ to $C_{12}$ for removing the second local oscillation signals, a coupling capacitor $C_{13}$ and a variable capacitance diode $D_1$.

In the second local oscillator 112, the oscillation frequencies of the second local oscillation signals are set at prescribed values due to capacitance change of the variable capacitance diode $D_2$ in response to voltage change of a control signal AFT (auto frequency tuning). If the oscillation frequencies of the second local oscillation signals slightly deviate from normal frequencies in the state defined by the control signal AFT, these oscillation frequencies are finely controlled to the prescribed values by changing the capacitance of the capacitor $C_{17}$. This is because the inductance of the inductance element $I_1$ is not variable. The control signal AFT is supplied from an IC for QPSK demodulation which is connected to a subsequent stage for the I/Q signal demodulator part 54.

In the tuner part 40 according to the embodiment 1, as hereinabove described, the inductance element $I_1$ provided in the second local oscillator 112 is prepared from a surface mount type element such as a dielectric coaxial resonator or a microstripline which is reliably fixed to a substrate, and no air-core coil or the like is employed dissimilarly to the prior art. Thus, the following effect can be attained:

In the digital satellite broadcasting receiver, it is important to avoid the so-called microphonic noise resulting from fluctuation of the frequencies of the second local oscillation signals from the second local oscillator 112 of the I/Q signal demodulator part 54 caused by external vibration. While the picture quality is merely slightly deteriorated in an analog receiver depending on noise, images are mosaicked or dot losses are caused when noise is generated in a digital receiver, to remarkably deteriorate the picture quality. Therefore, such microphonic noise is preferably eliminated to the minimum.

When the inductance element $I_1$ is prepared from a surface mount type element which is reliably fixed to a substrate as shown in the embodiment 1, influences exerted by external vibration to the oscillation frequencies of the second local oscillator 112 are remarkably reduced as compared with the case of employing a conventional air-core coil. According to this embodiment, therefore, influences by microphonic noise can be extremely reduced as compared with the prior art.

Modification of Embodiment 1

In the embodiment 1, the first local oscillator 150 includes a single variable capacitance diode $D_1$, as shown in FIG. 12. However, the present invention is not restricted to this but a local oscillator 210 shown in FIG. 15 can be substituted for the first local oscillator 150, for example.

Figure 15:
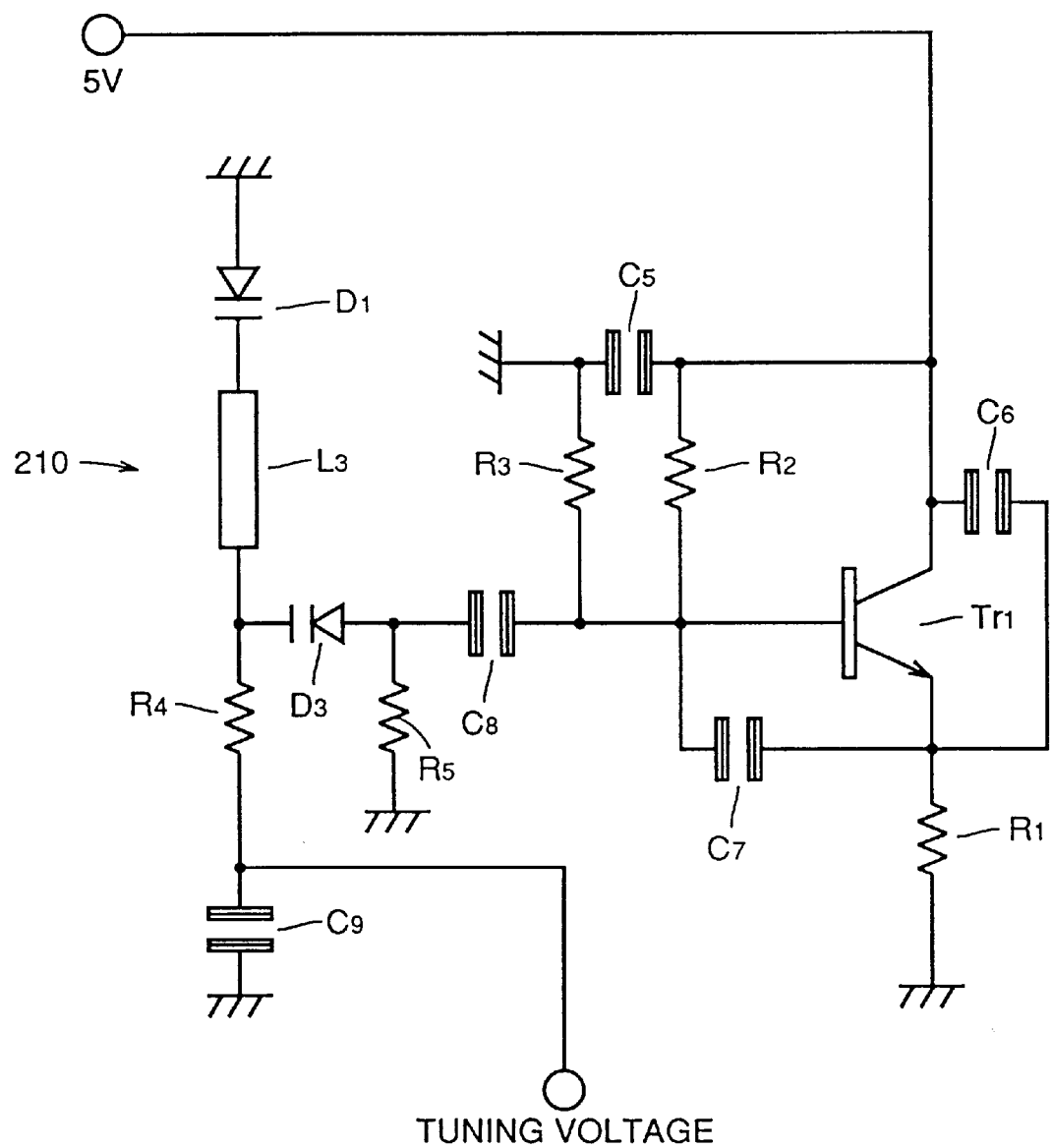
FIG. 15 is a circuit diagram of a first local oscillator in a modification of the embodiment 1.

The local oscillator 210 shown in FIG. 15 is different from the first local oscillator 150 shown in FIG. 12 in that an additional variable capacitance diode $D_3$ and a resistance $R_5$ for applying a tuning voltage to the variable capacitance diode $D_3$ are newly added. The remaining points of the local oscillator 210 are identical to those of the first local oscillator 150 shown in FIG. 12. Therefore, detailed description thereof is not repeated here.

Figure 16:
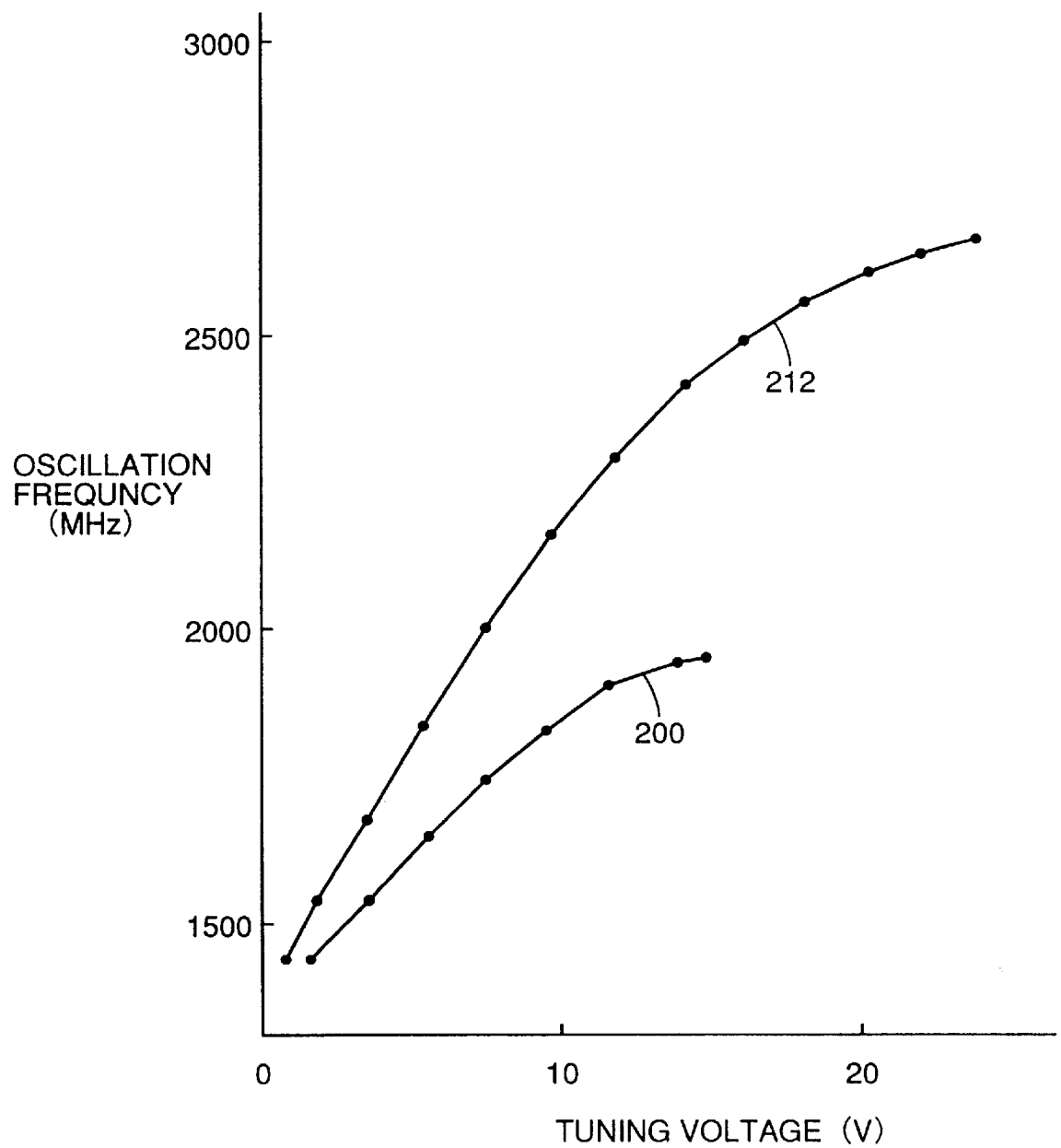
FIG. 16 is a graph illustrating the relation between tuning voltages and oscillation frequencies in the first local oscillator in the modification of the embodiment 1.

When the local oscillator 210 shown in FIG. 15 is employed in place of the first local oscillator 150, the range of oscillation frequencies employable with respect to tuning voltages of a constant range is doubled as compared with the curve 200 of the embodiment 1 as shown in a curve 212 of FIG. 16, whereby frequencies over a wider range can be selected.

Embodiment 2

In each of the embodiment 1 and its modification shown in FIGS. 1 to 16, the IF signal demodulator part 52 and the I/Q signal demodulator part 54 are formed on different substrates 42 and 44 and mounted on different chassis 56 and 58 respectively. However, the surfaces of the substrates 42 and 44 may not be flush with each other but may cause slight inclination therebetween depending on the assembled states of the IF signal demodulator part 52 and the I/Q signal demodulator part 54. In this case, the positions of the terminals 60 to 80 and 82 to 88 of the IF signal demodulator part 52 and the I/Q signal demodulator part 54 may be so displaced from each other that these terminals cannot be inserted in the main board 190. It is unpreferable to lose the effect attained in the embodiment 1, in order to attain accuracy which is necessary for inserting the terminals into the main board 190.

A tuner part 220 (see FIG. 17) according to an embodiment 2 of the present invention can avoid this problem.

While FIGS. 17 to 26 illustrate an apparatus according to the embodiment 2, components identical to those of the apparatus according to the embodiment 1 are denoted by the same reference numerals. The names and functions of these components are also identical to each other. Therefore, detailed description thereof is not repeated here.

Figure 17:
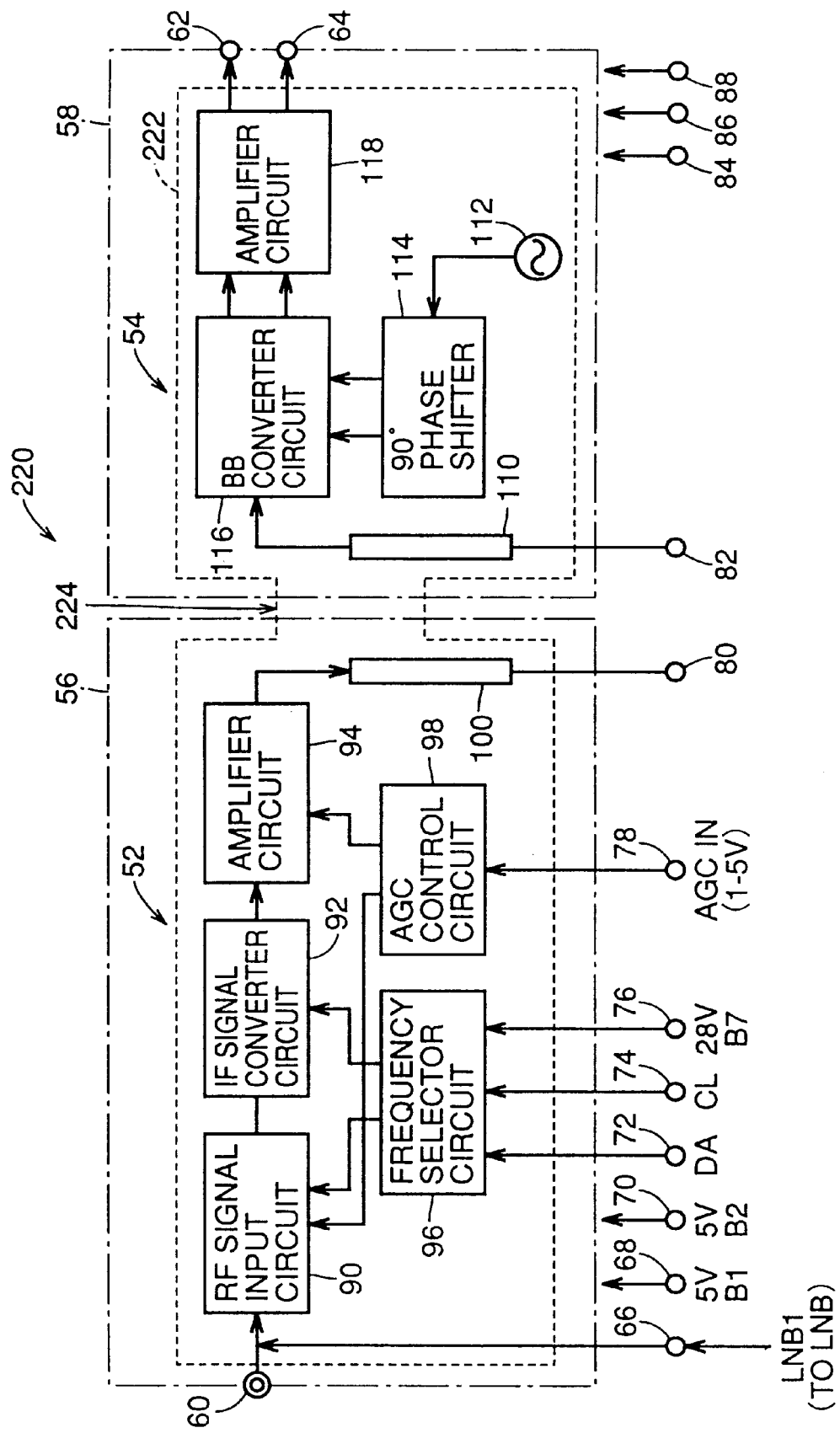
FIG. 17 is a block diagram showing a tuner part according to an embodiment 2.
Figure 18:
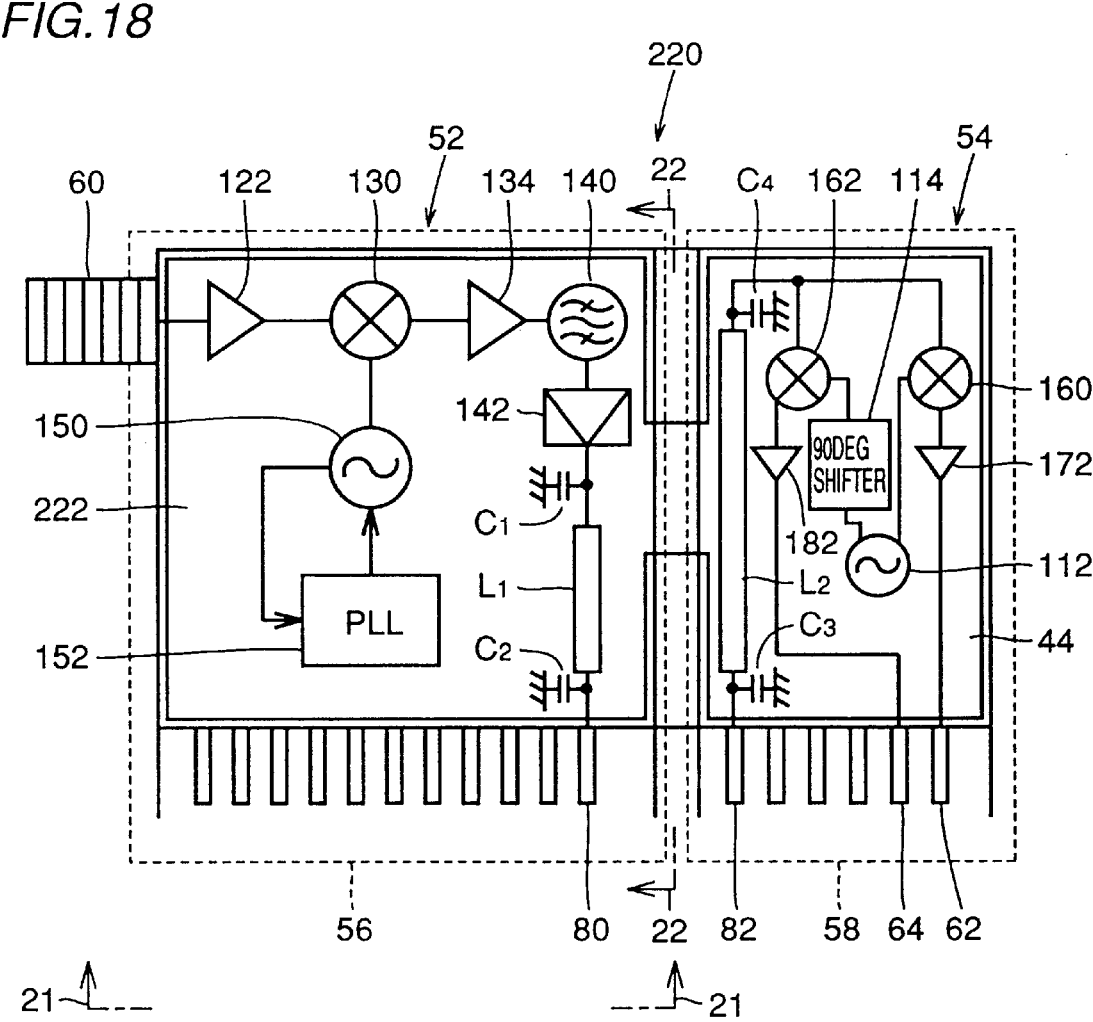
FIG. 18 is a block diagram of the tuner part showing a circuit arrangement state in case of forming an IF signal demodulator part and an I/Q signal demodulator part on a single substrate and covering the respective parts with individual chassis respectively.
Figure 19:
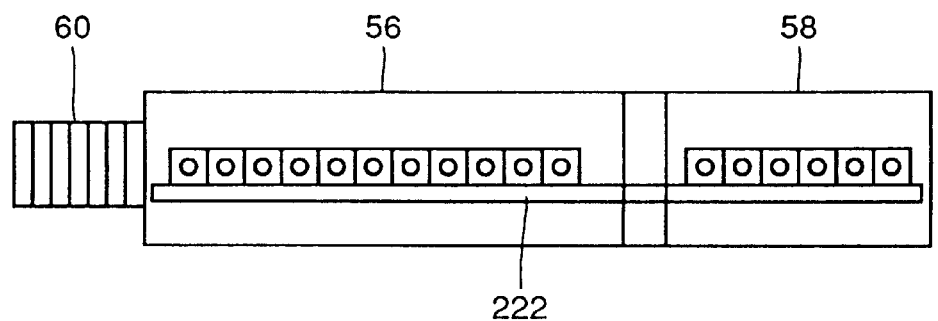
FIG. 19 is a bottom plan view of the tuner part in case of forming the IF signal demodulator part and the I/Q signal demodulator part on the single substrate and covering the respective parts with the individual chassis respectively.

Referring to FIGS. 17 to 19, the tuner part 220 according to the embodiment 2 is different from the tuner part 40 (see FIG. 1) of the embodiment 1 in that IF signal demodulator part 52 and I/Q signal demodulator part 54 are formed not on different substrates but on the same substrate 222. However, this substrate 222 has a narrow portion 224 between regions provided with the IF signal demodulator part 52 and the I/Q signal demodulator part 54 respectively, while the IF signal demodulator part 52 and the I/Q signal demodulator part 54 are stored in different chassis 56 and 58 respectively, similarly to the embodiment 1.

According to the structure shown in FIG. 17, the IF signal demodulator part 52 and the I/Q signal demodulator part 54 are formed on the single substrate 222, whereby no displacement between positions of terminals is caused dissimilarly to the above. Further, the IF signal demodulator part 52 and the I/Q signal demodulator part 54 are covered with different chassis 56 and 58 respectively, whereby harmonics of second local oscillation signals of the I/Q signal demodulator part 54 can be effectively prevented from being mixed into the IF signal demodulator part 52 and causing signal interference.

Figure 20:
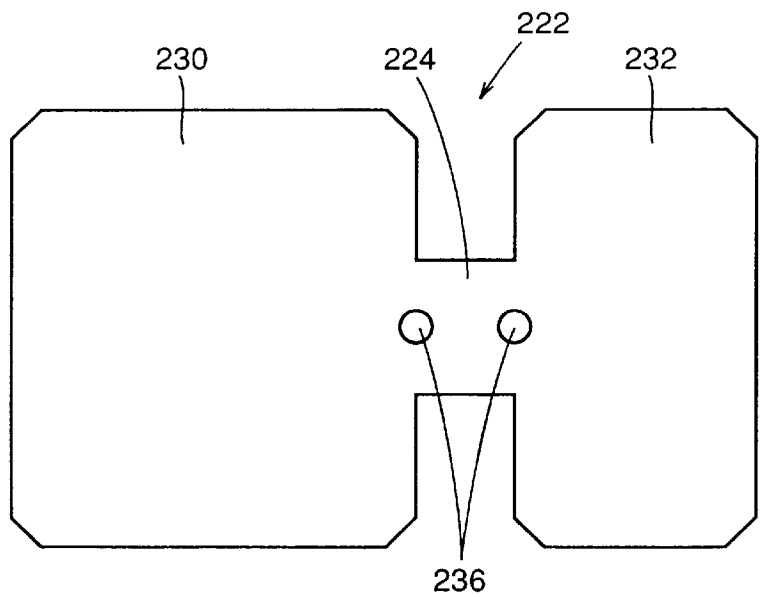
FIG. 20 is a front elevational view showing the shape of the substrate employed in the embodiment 2.

The specific structure is now described with reference to FIGS. 20 to 26. The substrate 222 is a single member as shown in FIG. 20, and upper and lower portions of its central part are so notched as to define left and right circuit forming parts 230 and 232 and a coupling part 224 coupling these circuit forming parts 230 and 232 with each other. The IF signal demodulator part 52 and the I/Q signal demodulator part 54 are formed on the circuit forming parts 230 and 232 respectively. Receiving holes 236 for receiving inserters (described later) of the chassis 56 and 58 are formed in boundary portions between the coupling part 224 and the circuit forming parts 230 and 232 respectively.

Figure 21:
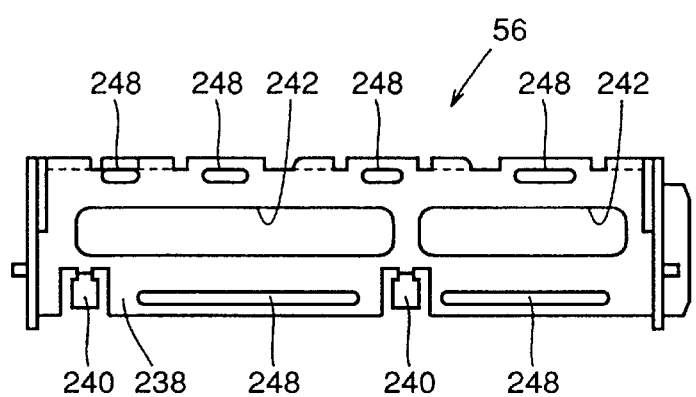
FIG. 21 is a bottom plan view showing a body part of the chassis for covering the IF signal demodulator part in the tuner part according to the embodiment 2.
Figure 22:
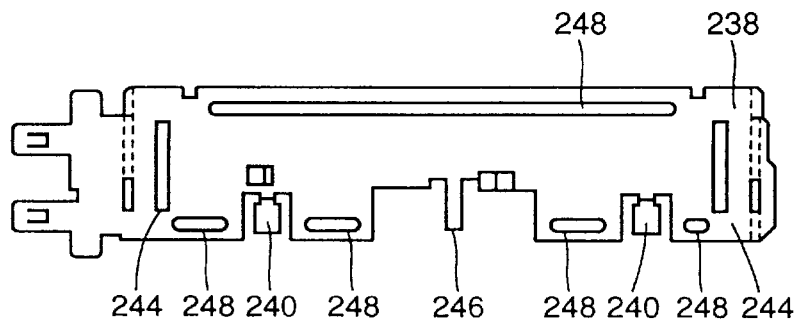
FIG. 22 is a side elevational view of a body part of the chassis for covering the I/Q signal demodulator part.

The chassis 56 provided on the side for forming the IF signal demodulator part 52 is made of a material prepared by plating an alloy of lead and tin on a steel sheet of about 0.6 mm in thickness. As shown in FIGS. 20 and 21, the chassis 56 has a frame-shaped body part 238, which is provided with latches 240 for catching the substrate 222. Terminal outlet holes 242 are provided on one side surface of the body part 238 for taking out terminals 66 to 80. A horizontal pair of mounting holes 244 for receiving catches 264 (see FIGS. 24 and 25) provided on the other chassis 58 as well as inserters 246 to be inserted in the receiving holes 236 of the substrate 222 are formed on the side surface of the body part 238 facing the chassis 58. Further, stop projections 248 for mounting upper and lower lids (not shown) on the body part 238 are formed on side portions of the body part 238 facing upper and lower surfaces respectively.

Figure 23:
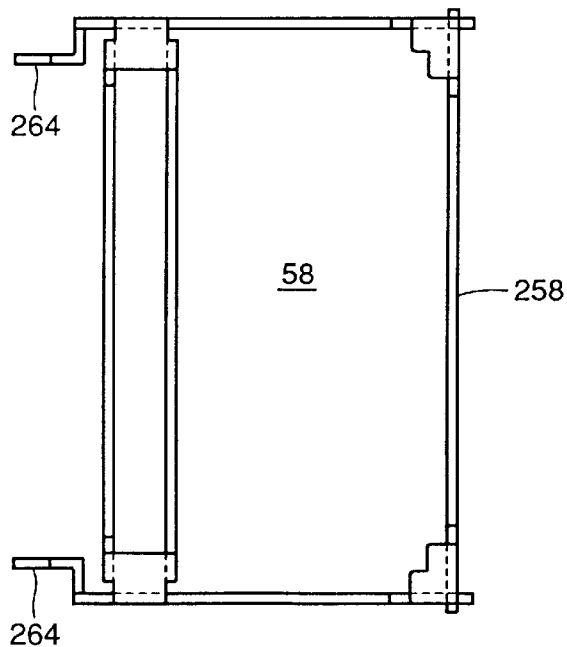
FIG. 23 is a front elevational view of the body part of the chassis for covering the I/Q signal demodulator part.
Figure 24:
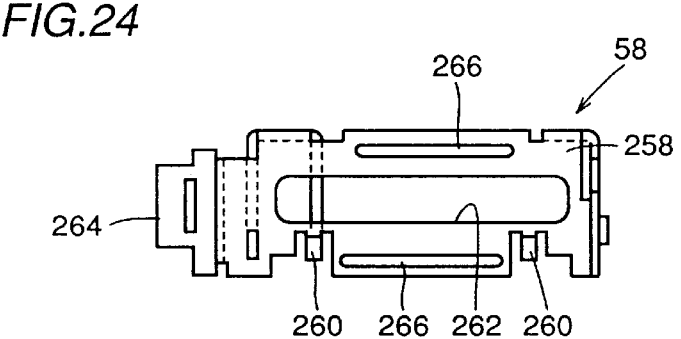
FIG. 24 is a bottom plan view of the body part of the chassis for covering the I/Q signal demodulator part.
Figure 25:
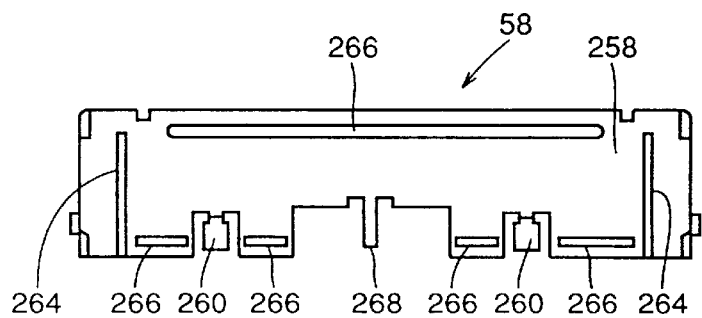
FIG. 25 is a side elevational view of the body part of the chassis for covering the I/Q signal demodulator part.

Referring to FIGS. 23 to 25, the chassis 58 provided on the side for forming the I/Q signal demodulator part 54 is made of the same material as the chassis 56, and has a frame-shaped body part 258 as shown in FIGS. 23 to 25. Latches 260 for catching the substrate 222 are formed on a lower portion of the body part 258. Terminal outlet holes 262 are provided on one side portion of the body part 258 for taking out terminals 62, 64 and 82 to 88. A horizontal pair of catches 264 to be mounted on the mounting holes 244 provided in the chassis 56 as well as inserters 268 to be inserted in the receiving holes 236 of the substrate 222 are formed on the side portion facing the chassis 56. Further, stop projections 266 for mounting upper and lower lids (not shown) on the body part 258 are formed on upper and lower side portions of the body part 238 respectively.

Figure 26:
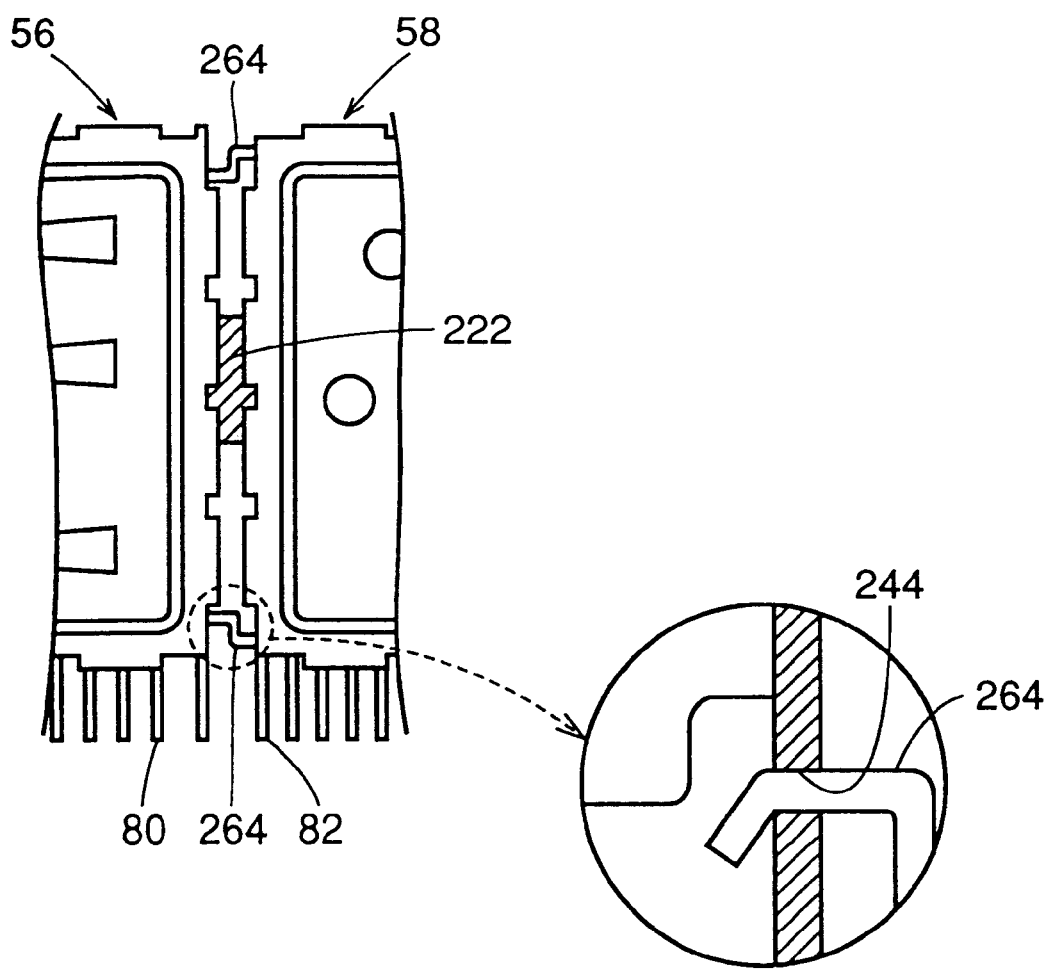
FIG. 26 is a partial front elevational view of the tuner part showing the state of a portion coupling the chassis for covering the IF signal demodulator part and the I/Q signal demodulator part respectively with each other.

In order to assemble the apparatus, the catches 264 of the chassis 58 are previously inserted in the mounting holes 244 of the chassis 56 as shown in FIG. 26, and then caulked to integrally couple the chassis 56 and 58 with each other, thereby forming a single part. Thus, the chassis 56 and 58 can be handled as an integrated substance, whereby an operation of mounting the substrate 222 on the chassis 56 and 58 is effectively simplified.

Then, the substrate 222 is inserted in the chassis 56 and 58. At this time, the direction of the substrate 222 is so set that the circuit forming parts 230 and 232 provided with the IF signal demodulator part 52 and the I/Q signal demodulator part 54 are positioned in the chassis 56 and 58 respectively. At the same time, the inserters 246 and 268 of the chassis 56 and 58 are inserted in the receiving holes 236 formed in the coupling part 224 of the substrate 222. Then, the latches 240 and 260 of the chassis 56 and 58 are inwardly bent to fix the substrate 222 to the chassis 56 and 58.

Due to the employment of the aforementioned single substrate 222, the terminals 62 to 88 of the demodulator parts 52 and 54 taken out from the terminal outlet holes 242 and 262 of the chassis 56 and 58 are necessarily flush with each other. Thus, mounting accuracy for mounting the substrate 222 and the chassis 56 and 58 on a main board is improved. Further, no careful operation is required for making the IF signal demodulator part 52 and the I/Q signal demodulator part 54 flush with each other, whereby the substrate 222 can be readily mounted on the main board.

Then, the substrate 222 and the chassis 56 and 58 are joined with each other by soldering in a solder dipping step, and the upper and lower lids (not shown) are finally stopped on the stop projections 248 and 266 of the body parts 238 and 258 of the chassis 56 and 58 respectively.

According to the tuner part 220 of the embodiment 2, the IF signal demodulator part 52 and the I/Q signal demodulator part 54 formed on the substrate 222 are covered with and stored in the chassis 56 and 58 respectively. However, the coupling part 224 of the substrate 222 is provided with no power supply line, signal line or ground pattern, whereby second local oscillation signals from a second local oscillator 112 of the I/Q signal demodulator part 54 are neither mixed into the IF signal demodulator part 52 through such a power supply line, signal line or ground pattern nor mixed into an ADC control circuit 98 from a 90° phase shifter 114 through a floating capacitance. Consequently, signal interference is prevented, and an excellent receiving state can be regularly maintained.

The chassis 56 and 58 are electrically connected with each other in the caulked portions of the catches 264. Since the inserters 246 and 268 of the chassis 56 and 58 are inserted in the receiving holes 236 of the substrate 222 respectively, the substrate 222 is reliably connected to the chassis 56 and 58 and reliably grounded. Thus, the aforementioned phenomenon of causing signal interference by the second local oscillation signals is further reliably prevented.

Embodiment 3

Figure 27:
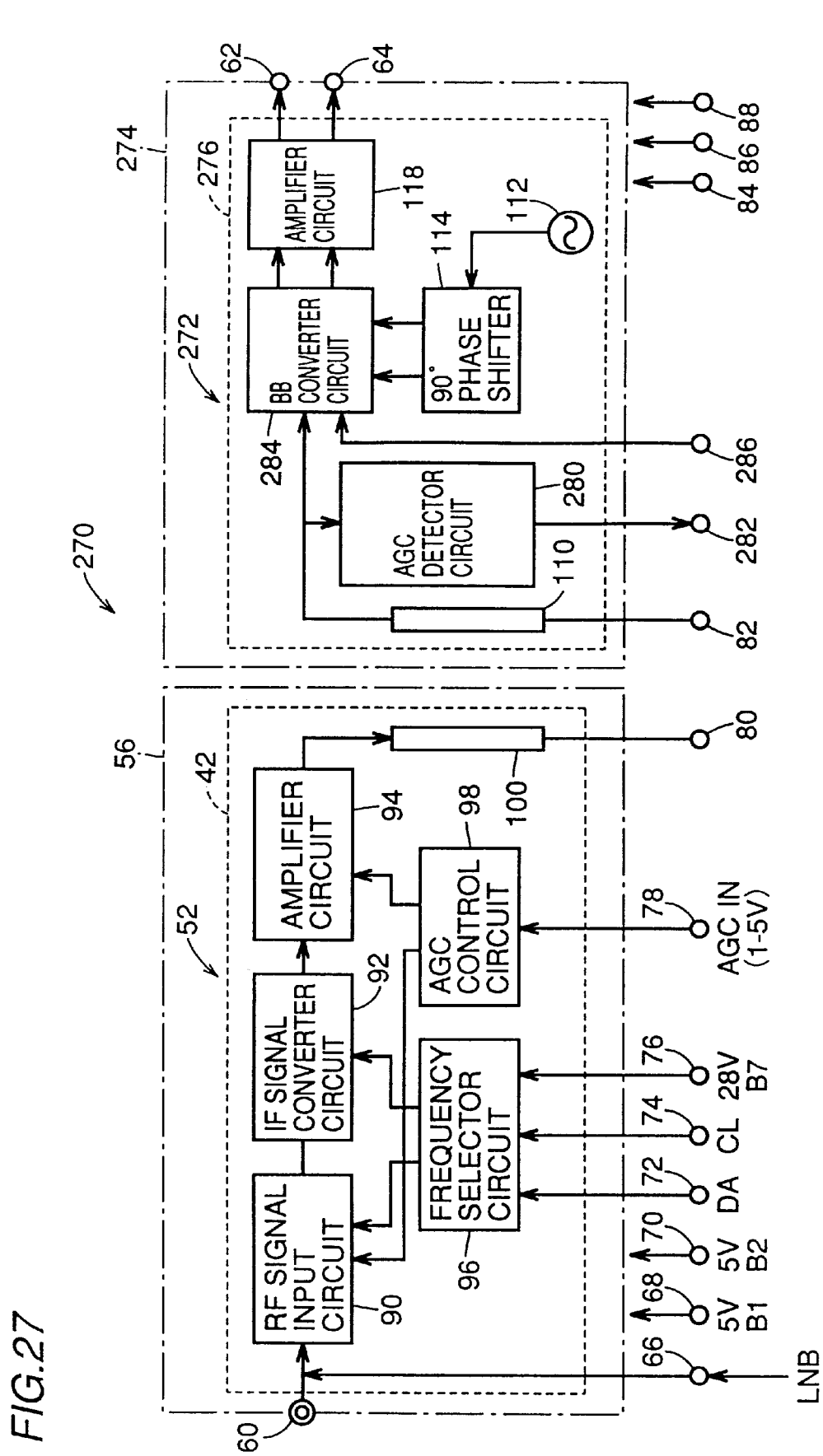
FIG. 27 is a block diagram showing a tuner part according to an embodiment 3.

FIG. 27 is a block diagram of a tuner part 270 according to an embodiment 3 of the present invention. Referring to FIG. 27, this tuner part 270 includes an IF signal demodulator part 52 which is identical to that in the embodiment 1, and an I/Q signal demodulator part 272 which is different from that in the embodiment 1. Referring to FIGS. 27 and 1, identical components are denoted by the same reference numerals. The names and functions of these components are also identical to each other. Therefore, detailed description thereof is not repeated here.

The I/Q signal demodulator part 272 is different from the I/Q signal demodulator part 54 according to the embodiment 1 in that the same includes a baseband converter circuit 284 for receiving an AGC control voltage from a subsequent IC for QPSK demodulation through a terminal 286, mixing an IF signal supplied from a low-pass filter 110 with second local oscillation signals supplied from a 90° phase shifter 110 respectively and level-controlling the same in response to the AGC control voltage' in place of the baseband converter circuit 116 of the embodiment 1, and that the same further includes an AGC detector circuit 280 for receiving the output of the low-pass filter 110, detecting the level of the IF signal inputted in the baseband converter circuit 284 and supplying the detected level to the AGC control circuit 98 as a control voltage.

An output of the AGC detector circuit 280 is supplied to the AGC control circuit 98 through a terminal 282, a main board (not shown), and a terminal 78 of the IF signal demodulator part 52. In each of the embodiments 1 and 2, the AGC control circuit 98 is supplied with the AGC control voltage from the subsequent QPSK demodulation IC. According to this embodiment, on the other hand, the AGC control circuit 98 operates in accordance with the control voltage from the subsequent I/Q demodulator circuit 272. Therefore, the IF signal inputted in the baseband converter circuit 284 is maintained at a substantially constant level. The AGC control voltage from the QPSK demodulation IC may simply fine-control the gain at the baseband converter circuit 284, whereby the AGC response of the overall tuner part 270 is effectively quickened.

Figure 28:
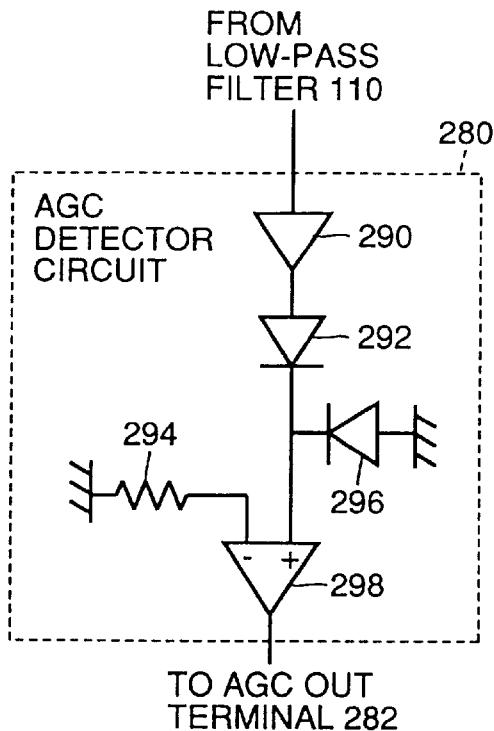
FIG. 28 is a block diagram of an AGC detector circuit.

FIG. 28 shows the circuit structure of the AGC detector circuit 280. Referring to FIG. 28, the AGC detector circuit 280 includes an amplifier 290, two diodes 292 and 296, a resistance 294 having a grounded first end, and an operational amplifier 298 having a plus terminal connected with outputs of the diodes 292 and 296 and a minus terminal connected with a second terminal of the resistance 294 respectively. An output of the operational amplifier 298 is connected to an AGC OUT terminal 282.

Figure 29:
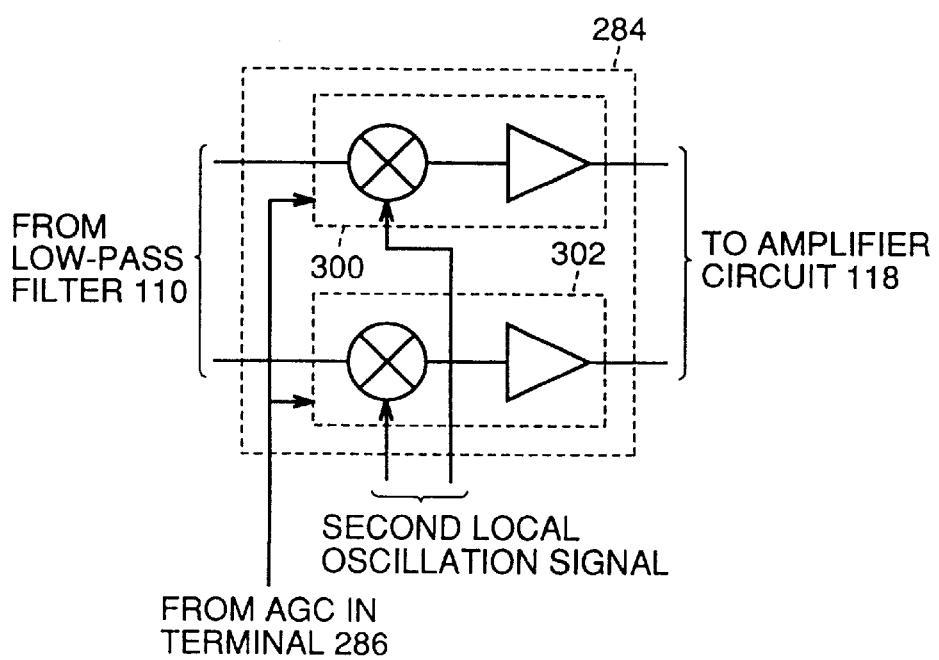
FIG. 29 is a circuit block diagram of a baseband converter circuit.

Referring to FIG. 29, the baseband converter circuit 284 includes mixers 300 and 302 for receiving the IF signal from the low-pass filter 110, mixing the same with the second local oscillation signals, which are 90° out of phase with each other, supplied from the 90° phase shifter 114 respectively and fine-controlling the gain in response to the AGC control voltage supplied from the terminal 286 respectively. Outputs of the mixers 300 and 302, which are I and Q signals respectively, are supplied to an amplifier circuit 118.

Referring to FIG. 27, the I/Q signal demodulator part 272 is stored in a chassis 274 which is different from a chassis 56. This chassis 274 has a similar shape to the chassis 58 in the embodiment 1. However, a substrate 276 in the embodiment 3 is somewhat larger than the substrate 44 of the embodiment 1, since the circuit scale of the I/Q signal demodulator part 272 is somewhat larger than that of the I/Q signal demodulator part 54 in the embodiment 1. Thus, the chassis 274 is also somewhat larger than the chassis 58 of the embodiment 1.

Figure 30:
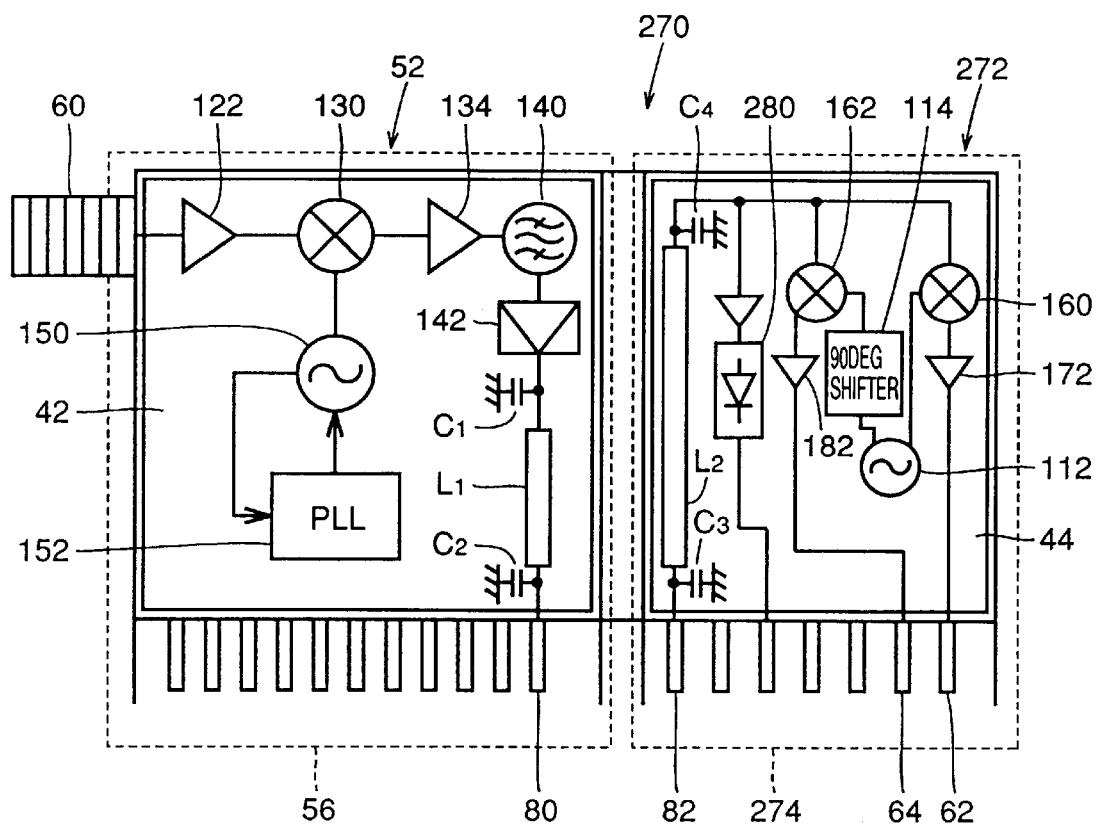
FIG. 30 is a front elevational block diagram of the tuner part showing a circuit arrangement state in case of covering an IF signal demodulator part and an I/Q signal demodulator part with different chassis respectively in the embodiment 3.

FIG. 30 shows a state of assembling the IF signal demodulator part 52 and the I/Q signal demodulator part 272 along with the chassis 56 and 274 in the apparatus according to the embodiment 3.

Figure 31:
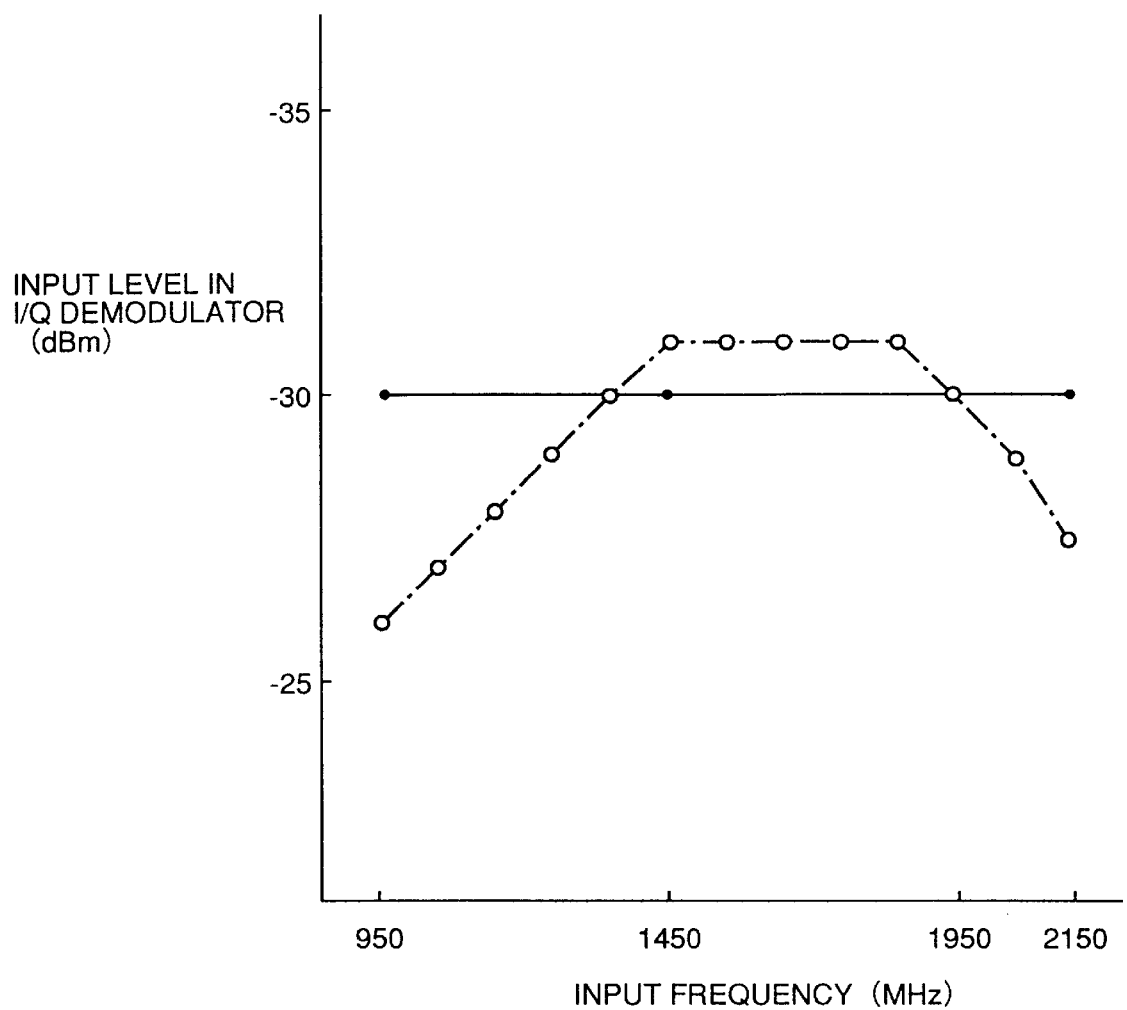
FIG. 31 is a graph showing the frequency characteristics of IF signals in the tuner part according to the embodiment 3, compared with the characteristics of the prior art.

According to the apparatus of the embodiment 3, the I and Q signals can be maintained at proper levels by finely controlling the gain in the baseband converter circuit 284. FIG. 31 shows this effect. As shown in FIG. 31, the input level in the I/Q demodulator is reduced in high and low input frequency portions in case of providing no AGC detector circuit 280 (shown by a one-dot chain line in FIG. 31), while the apparatus according to the embodiment 3 has a substantially constant input level as shown by a solid line in FIG. 31. Thus, I and Q signals of proper levels can be obtained by performing slight gain control at the baseband converter circuit 284, whereby digital satellite broadcasting can be effectively received in an excellent state, in addition to the effect attained by the embodiment 1.

Embodiment 4

In a tuner part 310 (see FIG. 32) according to an embodiment 4 of the present invention, the AGC detector circuit 280 provided in the apparatus of the embodiment 3 is employed in consideration of its effect, while an IF signal demodulator part and an I/Q signal demodulator part are formed on the same substrate again dissimilarly to the embodiment 3.

Figure 32:
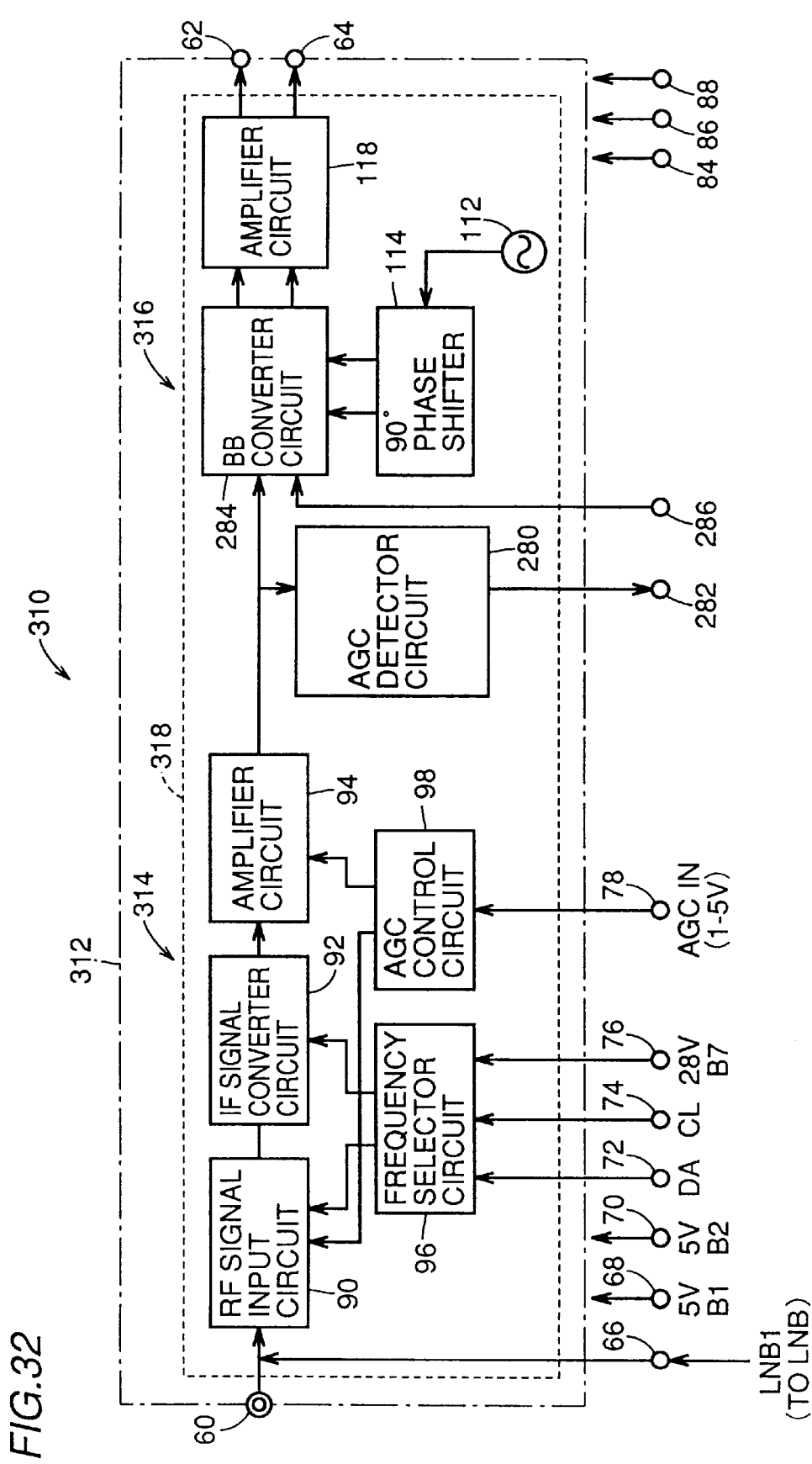
FIG. 32 is a block diagram showing a tuner part according to an embodiment 4.

Referring to FIG. 32, the tuner part 310 includes an IF signal demodulator part 314 and an I/Q signal demodulator part 316 which are formed on a single substrate 318.

The IF signal demodulator part 314 is different from the IF signal demodulator part 52 of the embodiment 3 only in a point that an output of an amplifier circuit 94 is directly connected to a baseband converter circuit 284, with provision of no low-pass filter 100. The I/Q signal demodulator part 316 is different from the I/Q signal demodulator part 272 of the embodiment 3 shown in FIG. 27 only in a point that no low-pass filter 110 is provided so that the baseband converter circuit 284 directly receives the output of the amplifier circuit 94. Referring to FIGS. 32 and 27, identical components are denoted by the same reference numerals. The names and functions of these components are also identical to each other. Therefore, detailed description thereof is not repeated here.

In the tuner part 310 according to the embodiment 4, the IF signal demodulator part 314 and the I/Q signal demodulator part 316 are formed on the same substrate 318, and stored in a single chassis 312. Also in this case, it is possible to maintain an IF signal at a substantially constant level by detecting the level of the IF signal inputted in the baseband converter circuit 284 by the AGC detector circuit 280 and controlling amplification in the amplifier circuit 94 in response to this value. An output of a proper level can be attained by simply fine-controlling a mixer in the baseband converter circuit 284. Thus, the AGC response is quickened in the overall tuner part 310, whereby demodulation in a subsequent stage can be effectively performed in an excellent state.

Figure 33:
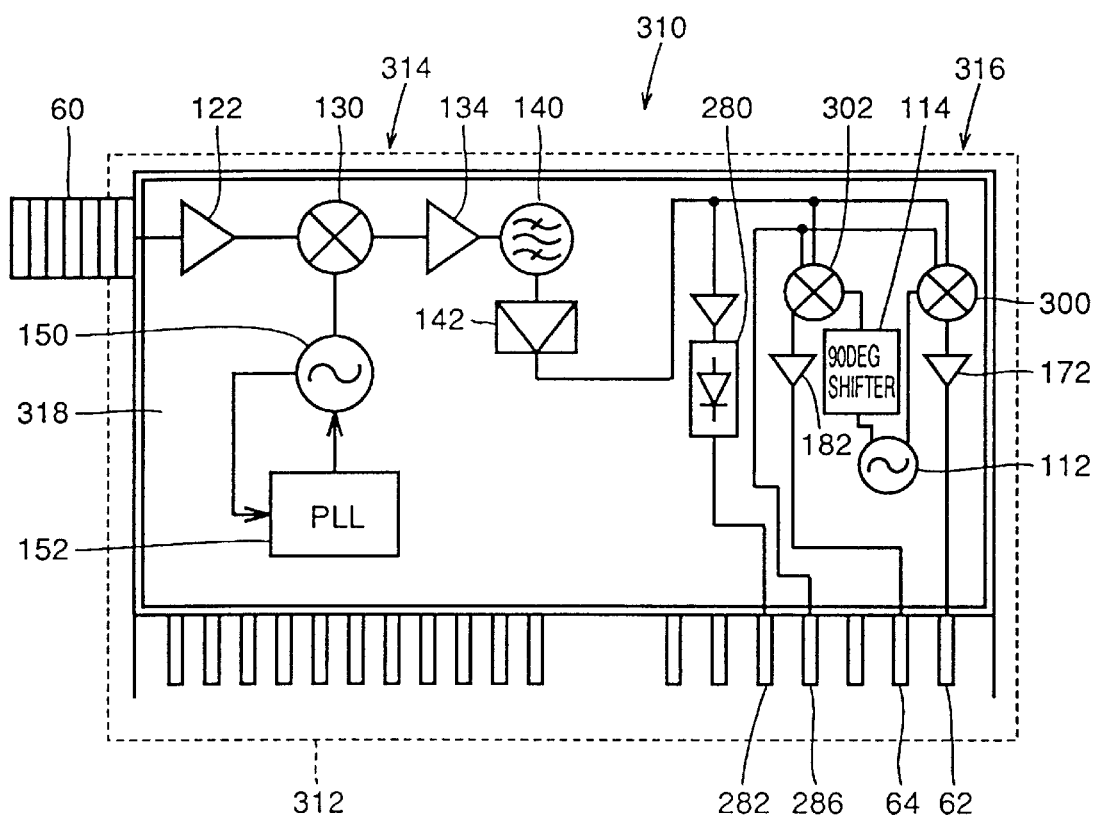
FIG. 33 is a front elevational block diagram of the tuner part according to the embodiment 4 showing its circuit arrangement state.

FIG. 33 schematically illustrates an assembled state of the substrate 318 and the chassis 312 in the apparatus according to the embodiment 4.

In the apparatus according to the embodiment 4, demodulation can be performed in an excellent state due to excellent AGC response, while no problem of displacement is caused in relation to the positions of terminals dissimilarly to the case of employing different substrates, due to the employment of the single substrate.

Embodiment 5

Figure 34:
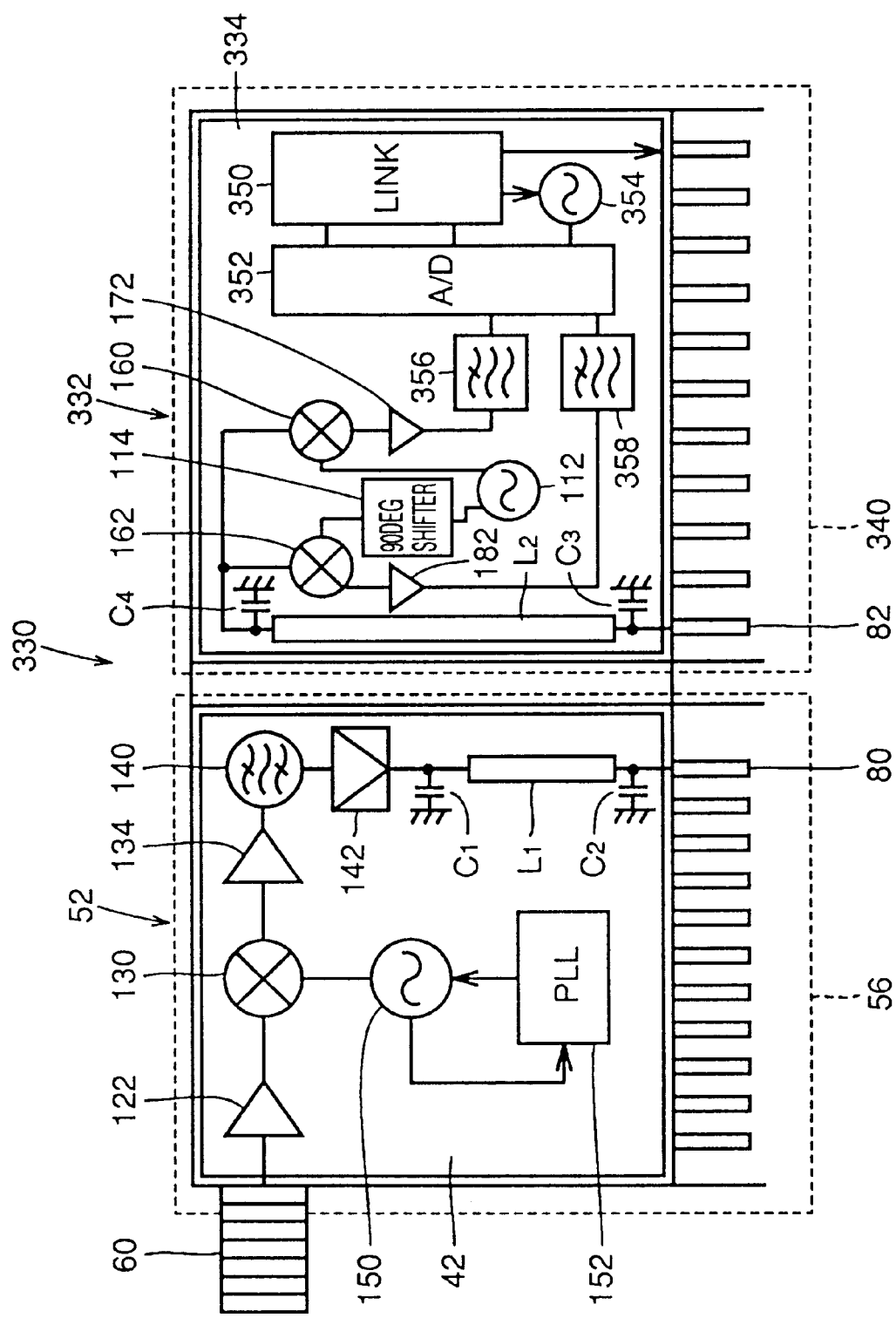
FIG. 34 is a front elevational block diagram of a tuner part according to an embodiment 5, showing its circuit arrangement.

FIG. 34 is a block diagram showing the circuit arrangement of a tuner part 330 according to an embodiment 5 of the present invention. Referring to FIG. 34, the feature of this tuner part 330, which is similar to the tuner part 40 of the embodiment 1, resides in that a demodulator part 332 including an integrated circuit 350 for QPSK demodulation is provided in place of the I/Q signal demodulator part 54 shown in FIG. 1. The integrated circuit for QPSK demodulation is placed in the subsequent stage for the I/Q signal demodulator part in each of the embodiments 1 to 4.

Referring to FIG. 34, the demodulator part 332 includes low-pass filters 356 and 358 for receiving outputs of amplifiers 172 and 182 respectively, an A/D converter 352 for analog-to-digital converting outputs of the low-pass filters 356 and 358, the integrated circuit 350 for performing QPSK demodulation, Viterbi decoding, Reed-Solomon error correction etc. shown in FIG. 35 on I and Q signals converted to digital values by the A/D converter 352 for obtaining a transport output, and a third local oscillator 354 whose frequency is controlled by the integrated circuit 350, in addition to the structure of the I/Q signal demodulator part 54 in the embodiment 1. A third local oscillation signal from the third local oscillator 354 is supplied to the low-pass filters 356 and 358.

In the tuner part 330 according to the embodiment 5, the demodulator part 332 is formed on a substrate 334, and stored in a chassis 340 which is different from a chassis 56 of a substrate 42 on the side of an IF signal demodulator part 52.

Referring to FIGS. 34, 1 and 8, identical components are denoted by the same reference numerals. The names and functions of these components are also identical to each other. Therefore, detailed description thereof is not repeated here.

The tuner part 330 according to the embodiment 5 has such an effect that a transport signal output can be stably obtained in a compact structure.

In each of the aforementioned embodiments, the second local oscillator 112 is assumed to be a quasi-synchronous circuit, such as a SAW oscillator, for example, which is not controlled by the subsequent QPSK demodulator. The SAW oscillator can oscillate a constant frequency in high accuracy with no control by a QPSK demodulator. However, the SAW oscillator is disadvantageously high-priced. If the QPSK demodulator can also control the second local oscillator, therefore, a synchronous circuit of a lower cost such as a tank oscillator may alternatively be employed.

According to the present invention, as hereinabove described, harmonics of second local oscillation signals of the I/Q signal demodulator part are prevented from being mixed into the IF signal demodulator part. Occurrence of signal interference in the IF signal demodulator part is prevented, and satellite broadcasting can be regularly received in an excellent state. Thus, no inconvenience such as deterioration of the picture quality is caused.

When the I/Q signal demodulator part and the IF signal demodulator part are formed on a common substrate, further, the terminals of the respective demodulator parts can be aligned with each other in high accuracy. Thus, the I/Q signal demodulator part and the IF signal demodulator part can be readily and correctly mounted on the main board.

When the IF signal demodulator part and the I/Q signal demodulator part are stored in different chassis which are integrally coupled with each other, these chassis can be handled as a single part. Thus, the tuner part can be further readily assembled.

When inserters for the substrate are formed on opposite portions of the chassis to be inserted in the substrate, both of the substrate and the chassis are reliably connected to the ground potential. Therefore, signal interference can be further reliably prevented.

When the IF signal demodulator part and the I/Q signal demodulator part are formed on different substrates, the I/Q signal demodulator part of the lower frequency side can be prepared from relatively low-priced paper phenol or the like. There is no need to employ relatively high-priced glass epoxy resin, whereby the cost for the tuner part can be reduced.

In case of providing low-pass filters through parts of wiring patterns, a flat characteristic with small signal level fluctuation can be attained in a necessary frequency band even if frequencies fluctuate. Thus, occurrence of bit errors is reduced and signals can be reliably received.

When the level of the IF signal which is supplied from the IF signal demodulator part to the I/Q signal demodulator part is detected and supplied to the amplifier means of the IF signal demodulator part as a control signal, the IF signal is at a substantially constant level. In the I/Q signal demodulator part, the output level can be maintained constant by simply fine-controlling the gain of the mixer. Thus, the response of the tuner part can be quickened, the demodulation processing in the subsequent stage can be performed in an excellent state, and the picture quality can be improved.

The second oscillation signal generating circuit may be a synchronous circuit provided with feedback from the PSK/QPSK demodulator of the subsequent stage, or a quasi-synchronous circuit oscillating local oscillation signals of prescribed frequencies with no feedback. In case of a synchronous circuit, a low-priced one such as a tank oscillator can be employed. In case of a quasi-synchronous local oscillator circuit, on the other hand, processing in the subsequent stage demodulator can be simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital satellite broadcasting receiver having a tuner part for receiving digital satellite broadcasting, including:

an IF signal demodulator part having a first oscillator circuit for selecting a signal of a single channel from a received RF signal and converting the same to an IF signal to be output, an I/Q signal demodulator part for demodulating the IF signal being outputted from said IF signal demodulator part, and outputting baseband signals including I and Q signals, wherein the I/Q signal demodulator part includes a second oscillation signal generating circuit for generating a second oscillation signal, having a frequency substantially identical to that of said IF signal, for orthogonally detecting said IF signal;

a first shielding storer for storing said IF signal demodulator part; and a second shielding storer, different from the first shielding storer, for storing said I/Q demodulator part, wherein the first and second shielding storers are coupled on a common substrate having a coupling part which is free of power supply lines, signal lines and ground patterns, such that oscillation harmonics from the second oscillation signal generating circuit of the I/Q signal demodulator part are not mixed into the received RF signal of the IF signal demodulator part.

2. The digital satellite broadcasting receiver in accordance with claim 1, wherein wherein said IF signal demodulator part and said I/Q signal demodulator part include circuit elements for IF signal demodulation and I/Q signal demodulation being arranged on different first and second regions of a surface of a common single substrate respectively, and said first and second shielding storers store said first and second regions of said common single substrate respectively.

3. The digital satellite broadcasting receiver in accordance with claim 2, wherein said first and second shielding storers are coupled with each other to form a single part, so that said common single substrate and said circuit elements for IF signal demodulation and I/Q signal demodulation being arranged on said common single substrate are stored in coupled said first and second shielding storers.

4. The digital satellite broadcasting receiver in accordance with claim 3, wherein each of said first and second shielding storers includes:
 a body part, and
 a protruding part being provided on a lower portion of said body part, and
said common single substrate has openings being formed in predetermined positions for receiving said protruding parts of said first and second shielding storers.

5. The digital satellite broadcasting receiver in accordance with claim 4, wherein said protruding parts of said first and second shielding storers are formed on positions to be opposed to each other when said first and second shielding storers are coupled with each other.

6. The digital satellite broadcasting receiver in accordance with claim 2, wherein said IF signal demodulator part includes:
 an RF signal input circuit for inputting said RF signal,
 a first oscillator circuit for oscillating a first local oscillation signal for selecting a signal of a single channel from said RF signal, and
 an amplifier section for mixing said local oscillation signal with said RF signal, converting the same to an IF signal, and amplifying said IF signal at an amplification factor being decided by an externally supplied control signal, and
said I/Q signal demodulator part includes:
 a second oscillation signal generating circuit for generating a second local oscillation signal, having a frequency being substantially identical to that of said IF signal, for orthogonally detecting said IF signal,
 a mixer for orthogonally detecting said IF signal with said local oscillation signal and demodulating said baseband signals,
 a detector circuit being connected to receive said IF signal being inputted in said mixer for detecting said IF signal being inputted in said mixer and outputting said control signal to be supplied to said amplifier circuit, and
 an amplifier circuit for amplifying outputs of said mixer, controlling the same to a prescribed bandwidth, and outputting the same.

7. The digital satellite broadcasting receiver in accordance with claim 1, wherein said second substrate is made of paper phenol.

8. The digital satellite broadcasting receiver in accordance with claim 7, wherein said IF signal demodulator part includes:
 an RF signal input circuit for inputting said RF signal,
 a first oscillator circuit for oscillating a first local oscillation signal for selecting a signal of a single channel from said RF signal, and
 an amplifier section for mixing said local oscillation signal with said RF signal, converting the same to an IF signal, and amplifying said IF signal at an amplification factor being decided by an externally supplied control signal, and
said I/Q signal demodulator part includes:
 a second oscillation signal generating circuit for generating a second local oscillation signal, having a frequency being substantially identical to that of said IF signal, for orthogonally detecting said IF signal,
 a mixer for orthogonally detecting said IF signal with said local oscillation signal and demodulating said baseband signals,
 a detector circuit being connected to receive said IF signal being inputted in said mixer for detecting said IF signal being inputted in said mixer and outputting said control signal to be supplied to said amplifier circuit, and
 an amplifier circuit for amplifying outputs of said mixer, controlling the same to a prescribed bandwidth, and outputting the same.

9. The digital satellite broadcasting receiver in accordance with claim 1, wherein said IF signal demodulator part includes:
 a substrate,
 a circuit element for IF signal demodulation being arranged on said substrate,
 an IF signal output terminal for deriving said IF signal being outputted from said circuit element for IF signal demodulation to the exterior of said substrate,
 a wiring pattern being formed on a surface of said substrate between said circuit element for IF signal demodulation and said IF signal output terminal, and
 a first low-pass filter being formed through said wiring pattern.

10. The digital satellite broadcasting receiver in accordance with claim 9, wherein said I/Q signal demodulator part includes:
 a second substrate being different from said substrate,
 a circuit element for I/Q signal demodulation being arranged on said second substrate,
 an IF signal input terminal for receiving said IF signal being outputted from said IF signal demodular to part and derived from said IF signal output terminal to the exterior of said substrate from said second substrate,
 a wiring pattern being formed on a surface of said second substrate between said IF signal input terminal and said circuit element for I/Q signal demodulation, and
 a second low-pass filter being formed through said wiring pattern.

11. The digital satellite broadcasting receiver in accordance with claim 10, wherein said IF signal demodulator part includes:
 an RF signal input circuit for inputting said RF signal,
 a first oscillator circuit for oscillating a first local oscillation signal for selecting a signal of a single channel from said RF signal, and
 an amplifier section for mixing said local oscillation signal with said RF signal, converting the same to an IF signal, and amplifying said IF signal at an amplification factor being decided by an externally supplied control signal, and said I/Q signal demodulator part includes:
 a second oscillation signal generating circuit for generating a second local oscillation signal, having a frequency being substantially identical to that of said IF signal, for orthogonally detecting said IF signal,
 a mixer for orthogonally detecting said IF signal with said local oscillation signal and demodulating said baseband signals,
 a detector circuit being connected to receive said IF signal being inputted in said mixer for detecting said IF signal being inputted in said mixer and outputting said control signal to be supplied to said amplifier circuit, and
 an amplifier circuit for amplifying outputs of said mixer, controlling the same to a prescribed bandwidth, and outputting the same.

12. The digital satellite broadcasting receiver in accordance with claim 9, wherein
 said IF signal demodulator part includes:
  an RF signal input circuit for inputting said RF signal,
  a first oscillator circuit for oscillating a first local oscillation signal for selecting a signal of a single channel from said RF signal, and
  an amplifier section for mixing said local oscillation signal with said RF signal, converting the same to an IF signal, and amplifying said IF signal at an amplification factor being decided by an externally supplied control signal, and
 said I/Q signal demodulator part includes:
  a second oscillation signal generating circuit for generating a second local oscillation signal, having a frequency being substantially identical to that of said IF signal, for orthogonally detecting said IF signal,
  a mixer for orthogonally detecting said IF signal with said local oscillation signal and demodulating said baseband signals,
  a detector circuit being connected to receive said IF signal being inputted in said mixer for detecting said IF signal being inputted in said mixer and outputting said control signal to be supplied to said amplifier circuit, and
  an amplifier circuit for amplifying outputs of said mixer, controlling the same to a prescribed bandwidth, and outputting the same.

13. The digital satellite broadcasting receiver in accordance with claim 1, wherein
 said IF signal demodulator part outputs demodulated said IF signal, and
 said I/Q signal demodulator part includes:
  a substrate,
  a circuit element for I/Q signal demodulation being arranged on said substrate,
  an IF signal input terminal for receiving said IF signal being outputted from said IF signal demodulator part,
  a wiring pattern being formed on a surface of said substrate between said IF signal input terminal and said circuit element for I/Q signal demodulation, and
  a low-pass filter being formed through said wiring pattern.

14. The digital satellite broadcasting receiver in accordance with claim 13, wherein
 said IF signal demodulator part includes:
  an RF signal input circuit for inputting said RF signal,
  a first oscillator circuit for oscillating a first local oscillation signal for selecting a signal of a single channel from said RF signal, and
  an amplifier section for mixing said local oscillation signal with said RF signal, converting the same to an IF signal, and amplifying said IF signal at an amplification factor being decided by an externally supplied control
 signal, and
 said I/Q signal demodulator part includes:
  a second oscillation signal generating circuit for generating a second local oscillation signal, having a frequency being substantially identical to that of said IF signal, for orthogonally detecting said IF signal,
  a mixer for orthogonally detecting said IF signal with said local oscillation signal and demodulating said baseband signals,
  a detector circuit being connected to receive said IF signal being inputted in said mixer and detecting said IF signal being inputted in said mixer for outputting said control signal to be supplied to said amplifier circuit, and
  an amplifier circuit for amplifying outputs of said mixer, controlling the same to a prescribed bandwidth, and outputting the same.

15. The digital satellite broadcasting receiver in accordance with claim 1, wherein
 said IF signal demodulator part includes:
  an RF signal input circuit for inputting said RF signal,
  a first oscillator circuit for oscillating a first local oscillation signal for selecting a signal of a single channel from said RF signal, and
  an amplifier section for mixing said local oscillation signal with said RF signal, converting the same to an IF signal, and amplifying said IF signal at an amplification factor being decided by an externally supplied control signal, and
 said I/Q signal demodulator part includes:
  a second oscillation signal generating circuit for generating a second local oscillation signal, having a frequency being substantially identical to that of said IF signal, for orthogonally detecting said IF signal,
  a mixer for orthogonally detecting said IF signal with said local oscillation signal and demodulating said baseband signals,
  a detector circuit being connected to receive said IF signal being inputted in said mixer for detecting said IF signal being inputted in said mixer and outputting said control signal to be supplied to said amplifier circuit, and
  an amplifier circuit for amplifying outputs of said mixer, controlling the same to a prescribed bandwidth, and outputting the same.

16. The digital satellite broadcasting receiver in accordance with claim 15, wherein
 said amplifier circuit includes:
  an amplifier for amplifying said baseband signals,
  a low-pass filter for limiting outputs of said amplifier to a prescribed bandwidth, and
  another amplifier for amplifying said outputs of said low-pass filter.

17. The digital satellite broadcasting receiver in accordance with claim 16, wherein
 said second oscillation signal generating circuit is a synchronous circuit being provided with feedback from a subsequent PSK/QPSK demodulator.

18. The digital satellite broadcasting receiver in accordance with claim 16, wherein
 said second oscillation signal generating circuit is a quasi-synchronous circuit for oscillating a local oscillation signal of a prescribed frequency with no feedback.

19. The digital satellite broadcasting receiver in accordance with claim 15, wherein
said second oscillation signal generating circuit is a synchronous circuit being provided with feedback from a subsequent PSK/QPSK demodulator.

20. The digital satellite broadcasting receiver in accordance with claim 15, wherein
said second oscillation signal generating circuit is a quasi-synchronous circuit for oscillating a local oscillation signal of a prescribed frequency with no feedback.

21. A digital satellite broadcasting receiver having a tuner circuit for receiving digital satellite broadcasting, including:
an IF signal demodulator part stored in a first shielding storer for selecting a signal of a single channel from a received RF signal, converting the same to an IF signal, amplifying said IF signal to a proper level, and outputting the same; and
an I/Q signal demodulator part stored in a second shielding storer separated from the first shielding storer for demodulating said IF signal being outputted from said IF signal demodulator part and outputting baseband signals including I and Q signals, wherein
said IF signal demodulator part includes:
an RF signal input circuit for inputting said RF signal, a first oscillator circuit for oscillating a first local oscillation signal for selecting said signal of said single channel from said RF signal, and
an amplifier section for mixing said first local oscillation signal with said RF signal, converting the same to an IF signal, and amplifying said IF signal at an amplification factor being decided by an externally supplied control signal, and
said I/Q signal demodulator part includes:
a second oscillation signal generating circuit for generating a second oscillation signal, having a frequency being substantially identical to that of said IF signal, for orthogonally detecting said IF signal,
a mixer for orthogonally detecting said IF signal with said local oscillation signal and demodulating said baseband signals,
a matching filter circuit being inserted in a front stage of said mixer for matching an IF output impedance of said IF signal demodulator part with an input impedance of said mixer, and
an amplifier circuit for amplifying outputs of said mixer, controlling the same to a prescribed bandwidth, and outputting the same,
wherein the first and second shielding storers are coupled on a common substrate having a coupling part which is free of power supply lines, signal lines and ground patterns, such that oscillation harmonics from the second oscillation signal generating circuit of the I/Q signal demodulator part are not mixed into the received RF signal of the IF signal demodulator part.

22. The digital satellite broadcasting receiver in accordance with claim 21, further including a detector circuit being connected to receive said IF signal being inputted in said mixer for detecting said IF signal and outputting said control signal to be supplied to said amplifier section.

23. The digital satellite broadcasting receiver in accordance with claim 22, wherein
said second oscillation signal generating circuit is a synchronous circuit being provided with feedback from a subsequent PSK/QPSK demodulator.

24. The digital satellite broadcasting receiver in accordance with claim 22, wherein
said second oscillation signal generating circuit is a quasi-synchronous circuit for oscillating a local oscillation signal of a prescribed frequency with no feedback.

25. The digital satellite broadcasting receiver in accordance with claim 21, wherein
said second oscillation signal generating circuit is a synchronous circuit being provided with feedback from a subsequent PSK/QPSK demodulator.

26. The digital satellite broadcasting receiver in accordance with claim 21, wherein
said second oscillation signal generating circuit is a quasi-synchronous circuit for oscillating a local oscillation signal of a prescribed frequency with no feedback.

27. The digital satellite broadcasting receiver in accordance with claim 21, wherein
said IF signal demodulator part is formed on a first substrate, and
said I/Q signal demodulator part is formed on a second substrate.

28. The digital satellite broadcasting receiver in accordance with claim 27, wherein
said IF signal demodulator part is formed by a single first shield structural body, and
said I/Q signal demodulator part is formed by a second shield structural body.

29. The digital satellite broadcasting receiver in accordance with claim 28, wherein
said first and second shield structural bodies are coupled with each other to form a single part.

30. The digital satellite broadcasting receiver in accordance with claim 23, wherein
said matching filter circuit includes a low-pass filter including a microstripline being formed on a substrate.

31. The digital satellite broadcasting receiver in accordance with claim 21, wherein
both of said first and second oscillation signal generating circuits include dielectric resonators as inductances.

32. The digital satellite broadcasting receiver in accordance with claim 1, wherein the IF signal has a frequency at about 480 MHz.

33. The digital satellite broadcasting receiver in accordance with claim 1, wherein the IF signal has a frequency above about 300 MHz.

34. A digital satellite broadcasting receiver having a tuner part for receiving digital satellite broadcasting, including:
an IF signal demodulator part stored in a first shielding storer, the IF signal demodulator part selecting a signal of a single channel from a received RF signal, converting the same to an IF signal, amplifying said IF signal to a proper level, and outputting the same; and
an I/Q signal demodulator part stored in a second shielding storer separated from the first shielding storer for eliminating unnecessary distortion, the I/Q signal demodulator part demodulating said IF signal being outputted from said IF signal demodulator part and outputting baseband signals including I and Q signals, wherein
said IF signal demodulator part includes:
an RF signal input circuit for inputting said RF signal, a first oscillator circuit for oscillating a first local oscillation signal for selecting said signal of said signal, and an amplifier section for mixing said first local oscillation signal with said RF signal, converting the same to an IF signal, and amplifying said IF signal at an amplification factor being decided by an externally supplied control signal, and said I/Q signal demodulator part includes:
    a second oscillation signal generating circuit for generating a second oscillation signal, having a frequency being substantially identical to that of said IF signal, for orthogonally detecting said IF signal,
    a mixer for orthogonally detecting said IF signal with said local oscillation signal and demodulating said baseband signals,
    a detector circuit being connected to receive said IF signal being inputted in said mixer for detecting said IF signal and outputting said control signal to be supplied to said amplifier section, and
    an amplifier circuit for amplifying outputs of said mixer, controlling the same to a prescribed bandwidth, and outputting the same,
    wherein the first and second shielding storers are coupled on a common substrate which is free of power supply lines, signal lines and ground patterns, such that oscillation harmonics from the second oscillation signal generating circuit of the I/Q signal demodulator part are not mixed into the received RF signal of the IF signal demodulator part.

35. A digital satellite broadcasting receiver having a tuner part for receiving digital satellite broadcasting, including:

an IF signal demodulator part which is stored in a first shielding storer attached to a first chassis part, the IF signal demodulator part selecting a signal of a single channel from a received RF signal, converting the same to an IF signal, amplifying said IF signal to a proper level, and outputting the same; and an I/Q signal demodulator part which is stored in a second shielding storer attached to a second chassis part separated from the first chassis part for eliminating unnecessary distortion, the I/Q signal demodulator part demodulating said IF signal being outputted from said IF signal demodulator part and outputting baseband signals including I and Q signals, wherein said IF signal demodulator part includes:
    an RF signal input circuit for inputting said RF signal,
    a first oscillator circuit for oscillating a first local oscillation signal for selecting said signal of said signal, and
    an amplifier section for mixing said first local oscillation signal with said RF signal, converting the same to an IF signal, and amplifying said IF signal at an amplification factor being decided by an externally supplied control signal, and said I/Q signal demodulator part includes:
    a second oscillation signal generating circuit for generating a second oscillation signal, having a frequency being substantially identical to that of said IF signal, for orthogonally detecting said IF signal,
    a mixer for orthogonally detecting said IF signal with said local oscillation signal and demodulating said baseband signals,
    a detector circuit being connected to receive said IF signal being inputted in said mixer for detecting said IF signal and outputting said control signal to be supplied to said amplifier section, and
    an amplifier circuit for amplifying outputs of said mixer, controlling the same to a prescribed bandwidth, and outputting the same,
    wherein the first and second chassis parts have independent power supply lines, signal lines and ground patterns, such that when the first and second chassis parts are coupled, oscillation harmonics from the second oscillation signal generating circuit of the I/Q signal demodulator part are not mixed into the received RF signal of the IF signal demodulator part.

\* \* \* \* \*